US012711847B2

(12) United States Patent
Kuhns

(10) Patent No.: US 12,711,847 B2
(45) **Date of Patent: *Aug. 18, 2026**

(54) METHODS AND SYSTEMS TO REDUCE THEFT IN GROUND-BASED CROP SPRAYING OPERATIONS

(71) Applicant: Philip Kuhns, Westmoreland, TN (US)

(72) Inventor: Philip Kuhns, Westmoreland, TN (US)

(*) Notice: Subject to any disclaimer, the term of this patent is extended or adjusted under 35 U.S.C. 154(b) by 203 days.

This patent is subject to a terminal disclaimer.

(21) Appl. No.: 18/636,735

(22) Filed: Apr. 16, 2024

(65) Prior Publication Data

US 2024/0265791 A1 Aug. 8, 2024

Related U.S. Application Data

(63) Continuation-in-part of application No. 18/524,481, filed on Nov. 30, 2023, now Pat. No. 12,525,103, (Continued)

(51) Int. Cl.

*G08B 13/14* (2006.01)
*A01D 43/07* (2006.01)
*H04L 9/40* (2022.01)

(52) U.S. Cl.

CPC ......... *G08B 13/1472* (2013.01); *A01D 43/07* (2013.01); *H04L 63/0428* (2013.01)

(58) Field of Classification Search

CPC .. G08B 13/1472; A01D 43/07; H04L 63/0428
See application file for complete search history.

(56) References Cited

U.S. PATENT DOCUMENTS 5,379,224 A * 1/1995 Brown .................... G01S 19/09 73/178 R
6,041,582 A * 3/2000 Tiede .................. A01B 79/005 56/10.2 A (Continued)

FOREIGN PATENT DOCUMENTS

JP 2006061104 A 3/2006
JP 2019121116 A 7/2019

OTHER PUBLICATIONS

Eurasian Search Report completed Jan. 12, 2023 for Eurasian Application No. 202291805, 3 pages.

*Primary Examiner* — Hoi C Lau
(74) *Attorney, Agent, or Firm* — Dickinson Wright PLLC; Damian M. Aquino

(57) ABSTRACT

A method for tracking agricultural material to be transferred from a first entity to a second entity includes generating a transaction record indicating a destination location for the agricultural material and a first amount of the agricultural material to be applied at the destination location, receiving measurement information indicating a second amount of the agricultural material applied by vendor equipment at the destination location and location information indicating locations of the vendor equipment while applying the second amount of the agricultural material, updating the transaction record based on the received measurement information and location information, and at least one of transmitting, using a satellite data communication protocol, the transaction record to the second entity, and determining whether any of the agricultural material was not applied at the destination location based on a comparison between the first amount and the second amount and transmitting a notification based on the determination.

20 Claims, 17 Drawing Sheets

Related U.S. Application Data which is a continuation-in-part of application No. 18/364,654, filed on Aug. 3, 2023, now Pat. No. 12,100,272, which is a continuation of application No. 17/374,622, filed on Jul. 13, 2021, now Pat. No. 11,756,396.

(56) References Cited

U.S. PATENT DOCUMENTS 6,522,948 B1* 2/2003 Benneweis .......... A01C 23/047 701/50
6,990,459 B2* 1/2006 Schneider .......... G06Q 10/0635 705/7.36
7,047,103 B2* 5/2006 Hornbaker ............ G06K 19/04 700/225
8,634,765 B2 1/2014 Plamondon
8,789,563 B2 7/2014 Wenzel
9,119,342 B2* 9/2015 Bonefas ................ A01D 75/02
9,128,867 B2 9/2015 Cawse et al.
9,268,911 B2 2/2016 Sia et al.
9,338,825 B2* 5/2016 Bulgajewski ............ H01Q 1/22
9,529,364 B2* 12/2016 Foster .................. A01B 69/004
9,607,276 B2* 3/2017 Dlott .................... G06Q 10/063
9,820,436 B2* 11/2017 Inoue ................. A01D 41/1274
10,143,132 B2* 12/2018 Inoue ................ A01D 41/1272
10,234,562 B2 3/2019 Janky et al.
10,278,328 B2* 5/2019 Thomson ........... A01D 41/1217
10,945,367 B2* 3/2021 Inoue ................. A01D 41/1208
10,963,825 B2* 3/2021 Tatge .................. G06F 13/4282
11,188,098 B2* 11/2021 Desai ................... G05D 1/0291
11,310,963 B2* 4/2022 Burnley ................... G05D 1/02
11,315,052 B2* 4/2022 Chanasyk ........ G06Q 10/06313
11,372,402 B2* 6/2022 Desai .................... B60W 10/20
11,756,396 B2* 9/2023 Kuhns ................ H04W 12/033 340/568.1
12,100,272 B2* 9/2024 Kuhns ................ G08B 13/1472
12,525,103 B2* 1/2026 Kuhns .................... A01D 43/07
2002/0040300 A1* 4/2002 Ell ..................... G06Q 10/0631 705/26.1
2003/0182259 A1 9/2003 Pickett et al.
2004/0128045 A1* 7/2004 Benneweis .......... A01C 21/005 239/69
2006/0169776 A1* 8/2006 Hornbaker ............ G06K 19/04 340/572.1
2008/0077320 A1 3/2008 Loftus et al.
2008/0278314 A1 11/2008 Miller et al.
2011/0084851 A1* 4/2011 Peterson ............ A01M 7/0089 340/902
2011/0092158 A1 4/2011 Plamondon
2011/0290873 A1* 12/2011 Nishiguchi ............ G06Q 10/06 235/376
2012/0089304 A1* 4/2012 Hamilton ............... G06Q 99/00 701/50
2012/0101861 A1* 4/2012 Lindores .............. A01B 79/005 705/7.11
2012/0200697 A1* 8/2012 Wuestefeld .............. H04N 7/18 198/810.01
2013/0267749 A1* 10/2013 Yanagawa ........... B01J 29/7049 502/61
2014/0311113 A1* 10/2014 Bonefas ................. A01D 75/02 56/10.2 R
2014/0333453 A1 11/2014 Sia et al.
2014/0372166 A1* 12/2014 Chanasyk ........ G06Q 10/06313 705/7.23
2015/0006212 A1* 1/2015 Covely ........... G06Q 10/06311 705/7.13
2015/0205308 A1 7/2015 Huat
2015/0264866 A1* 9/2015 Foster .................... B65G 67/24 414/21
2016/0245678 A1* 8/2016 Yang ................... A01M 7/0089
2016/0253595 A1* 9/2016 Mathur .................. G06F 30/00 706/12
2017/0031840 A1 2/2017 Cawse et al.
2017/0075354 A1 3/2017 Putkonen et al.
2017/0172057 A1* 6/2017 Rylander ............. A01C 7/0443
2018/0101612 A1* 4/2018 Rosztoczy .............. G06F 16/29
2018/0129987 A1* 5/2018 Tatge .................... H04W 4/029
2018/0242521 A1* 8/2018 Thomson ............... B65G 65/34
2019/0095358 A9 3/2019 Cawse et al.
2019/0361148 A1 11/2019 Ulmer et al.
2020/0060071 A1* 2/2020 Kowalchuk ............. G01F 1/704
2020/0146207 A1* 5/2020 Long ..................... A01B 63/111
2020/0167703 A1* 5/2020 Tatge .................... H04W 4/029
2020/0319632 A1* 10/2020 Desai ........................ B60P 1/00
2020/0319655 A1* 10/2020 Desai ................... A01B 69/008
2021/0078853 A1* 3/2021 Long ...................... B67D 7/145
2021/0386011 A1* 12/2021 Goering ............... A01C 21/007
2022/0156670 A1* 5/2022 Issrani .................. B62B 5/0096
2022/0228902 A1* 7/2022 Von Muenster ..... G01G 15/006
2022/0228906 A1* 7/2022 Von Muenster ....... G01G 23/14
2022/0272960 A1* 9/2022 Long ................... A01M 7/0089
2023/0018114 A1* 1/2023 Kuhns ................... H04W 12/71
2023/0030848 A1* 2/2023 Buckland ............... A01D 46/30
2023/0072664 A1* 3/2023 Walker .................. A01F 12/181
2023/0108200 A1* 4/2023 Von Muenster ....... G01G 13/16 177/1
2023/0377432 A1* 11/2023 Kuhns ................. H04W 12/009
2024/0032468 A1* 2/2024 Todderud ............. A01D 41/141
2024/0096184 A1* 3/2024 Kuhns .................... A01D 43/07
2024/0265791 A1* 8/2024 Kuhns .................... A01D 43/07
2025/0089697 A1* 3/2025 Bachman ............ A01M 7/0057
2025/0301954 A1* 10/2025 Singh ..................... G06Q 10/08
2025/0380632 A1* 12/2025 Bernardi ............. A01M 7/0042

* cited by examiner

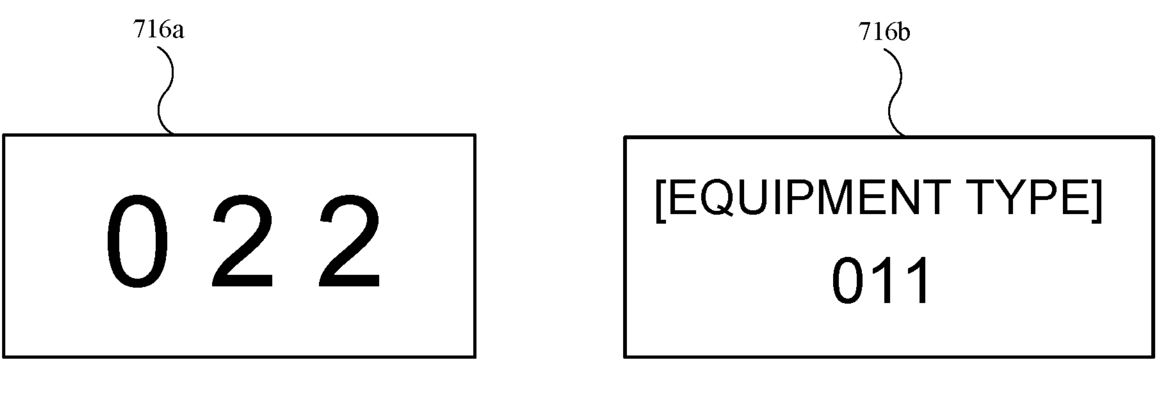
*FIG. 7A*
*FIG. 7B*
*FIG. 7C*
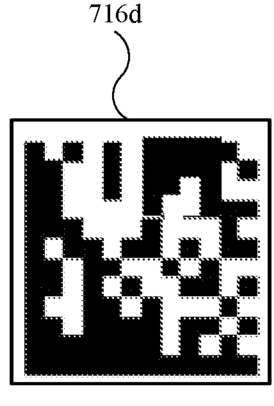
*FIG. 7D*
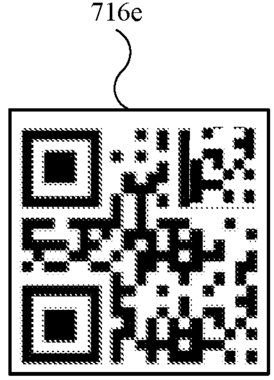
*FIG. 7E*

1216
1204
1230
1220
1224
1220
1212
1224
1206
1216
1216
1200
1208
1208

1230
1220
1216
1210
1220
1206
1212
1216
1208
1200

METHODS AND SYSTEMS TO REDUCE THEFT IN GROUND-BASED CROP SPRAYING OPERATIONS

CROSS-REFERENCE TO RELATED APPLICATIONS

The present disclosure is a continuation-in-part of U.S. patent application Ser. No. 18/524,481, filed Nov. 30, 2023, which is a continuation-in-part of U.S. patent application Ser. No. 18/364,654, filed Aug. 3, 2023, which is a continuation application of U.S. patent application Ser. No. 17/374,622, filed on Jul. 13, 2021 (now U.S. Pat. No. 11,756,396). The entire disclosures of the applications referenced above are incorporated herein by reference.

BACKGROUND

Planting, growing, and harvesting operations generally require multiple vehicles. In an exemplary harvesting process, a harvesting machine cuts a crop and stores the crop in a bin. Then, a cart moves alongside the harvesting machine while the harvesting machine empties the crop into the cart. After that, the cart empties the crop into a trailer, and the trailer is subsequently hauled to a storage facility such as an elevator or a silo. Similarly, planting and growing operations may require multiple vehicles. For example, a planting operation may include transferring seed from a trailer or container to a seed tender and from the seed tender to a planter, or directly from the trailer or other container to the planter.

While several advances in the vehicles can lead to a more efficient harvesting, planting, and other operations, there are some drawbacks. For example, the "chain of custody" of the crop (e.g., grain) or seed from machine to machine is susceptible to theft, as each transfer of the crop or seed from one machine to another gives various persons—machine operators, farm workers, or other nefarious actors—an opportunity to steal the crop or seed. As the crop or seed is transferred from one machine to another, it is difficult to visually determine whether any crop or seed is stolen. For example, most crop recording nay be performed manually near the end stage of the crop transfer process, i.e., at the storage facility. Accordingly, when the crop is stolen at an earlier stage, it is difficult to tell at which stage(s) it was stolen, and who is responsible party/parties for stealing the crop. Similar problems exist for seed, fertilizer, and other agricultural materials.

SUMMARY

A method for tracking agricultural material to be transferred from a first entity to a second entity includes generating, at a transaction management system, a transaction record indicating a destination location for the agricultural material and a first amount of the agricultural material to be applied at the destination location, receiving, at the transaction management system, measurement information indicating a second amount of the agricultural material applied by vendor equipment at the destination location and location information indicating locations of the vendor equipment while applying the second amount of the agricultural material, updating, at the transaction management system, the transaction record based on the received measurement information and location information, and at least one of transmitting, by the transaction management system using a satellite data communication protocol, the transaction record to the second entity, and determining, by the transaction management system, whether any of the agricultural material was not applied at the destination location based on a comparison between the first amount and the second amount and transmitting a notification based on the determination.

Further embodiments include methods of performing various functions described in the present disclosure.

Other embodiments include a non-transitory computer readable storage medium configured to store instructions that, when executed by a processor included in a computing device, cause the computing device to carry out the various steps of any of the foregoing methods. Further embodiments include systems configured to carry out the various steps of any of the foregoing methods and or one or more processors or processing devices configured to carry out the various steps of any of the foregoing methods.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

For a detailed description of example embodiments, reference will now be made to the accompanying drawings in which:

FIGS. 7A-7E show various embodiments of an indicia used to identify machinery;

DEFINITIONS

Figures 1A, 1B:
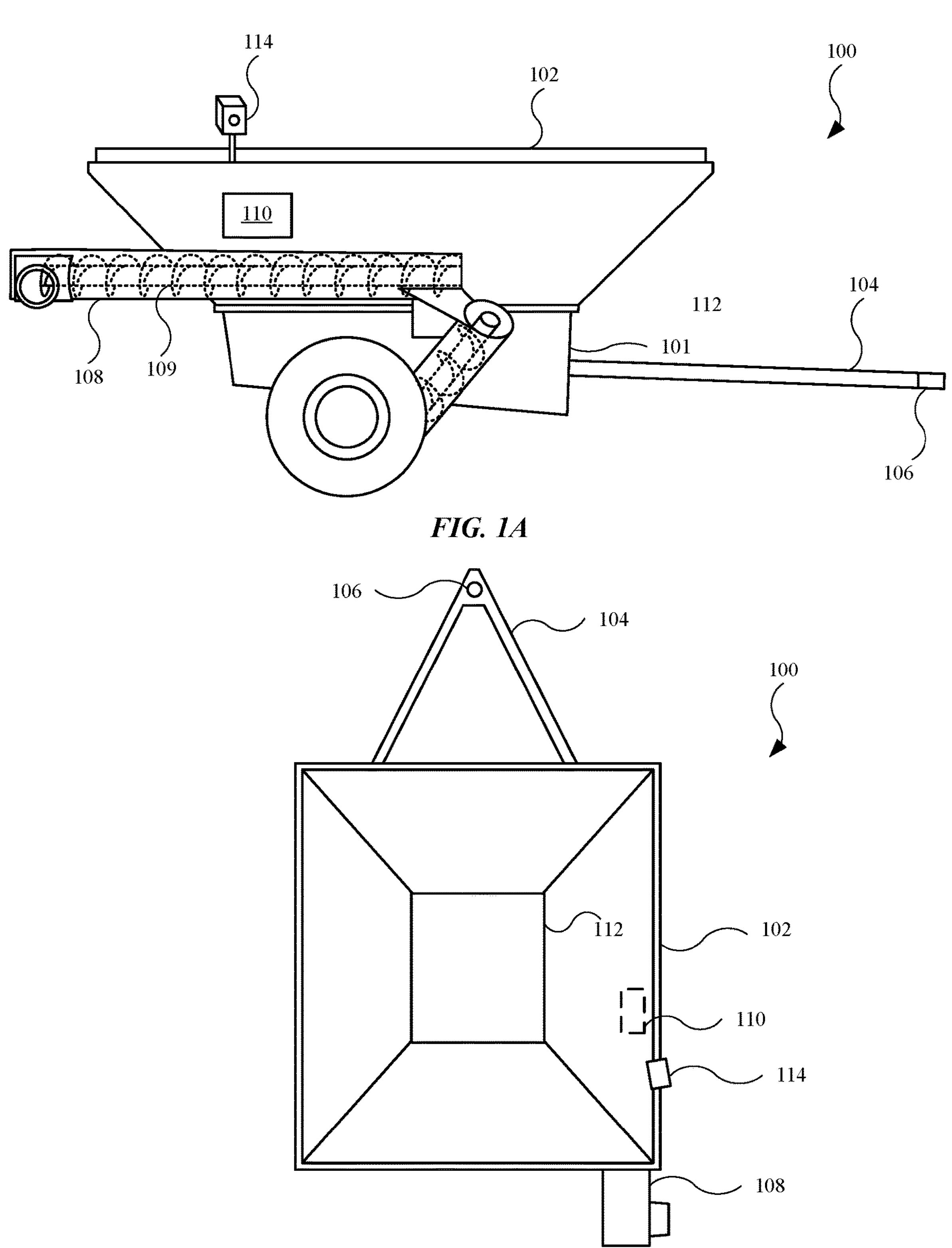
FIGS. 1A and 1B show an embodiment of a grain cart.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC), a digital signal processor (DSP), process with controlling software, a processor with controlling software, a programmable logic device (PLD), or a field programmable gate array (FPGA), configured to read inputs and drive outputs responsive to the inputs.

"Short-range wireless communication protocol" shall mean a wireless communication protocol in which two device directly communicate with each other wirelessly over a distance of 500 meters or less. For example, Wi-Fi, Bluetooth, Zigbee, Z-Wave, as well as certain radio frequency identification (RFID) tags and associated readers. Data communications over a cellular network shall not be considered a short-range wireless communication protocol.

"Short-range data communication module" shall mean electronic hardware devices designed and constructed to communicate using the short-range wireless data communication protocol.

"Satellite data communication protocol" shall mean a wireless communication protocol in which a land-based device directly communicates with a satellite orbiting the Earth, and the satellite relays the data to and from a remote location.

"Satellite data communication module" shall mean electronic hardware devices designed and constructed to communicate using the satellite data communication protocol.

"A", "an", and "the" as used herein refers to both singular and plural referents unless the context clearly dictates otherwise. By way of example, "a processor" programmed to perform various functions may refer to one processor programmed to perform each and every function, or more than one processor collectively programmed to perform each of the various functions, or more than one processor each programmed to perform each and every function.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure includes an embodiment directed to a grain cart with a theft detection system designed to prevent unwanted grain theft during a harvesting operation. As grain is harvested and transported between different machinery, each transportation event is susceptible to grain being stolen by any number of persons. To prevent this, the theft detection system includes hardware and communication components mounted to the grain cart. When mounted to a grain cart, the theft detection system may include a sensing device designed to determine a weight value, or amount, of grain during an onboarding event (i.e., when the grain cart receives grain from a harvesting machine) and send the weight value information to a remote tracking system, where the weight value information can be stored or analyzed. Additionally, the theft detection system can use the sensing device to determine a weight value of grain in the grain cart during an offloading event (i.e., when the grain cart transfers grain to a trailer) and send the weight value information to the remote tracking system.

In some examples, the grain cart includes a camera system used to identify respective indicia, or markings, on both the harvesting machine and the trailer. In this manner, the theft detection system not only tracks the amount of grain during onboarding and offloading events, but also tracks the identity of the machinery used during the onboarding and offloading events. The theft detection system can send the identification information along with the weight value information to the remote tracking system, thereby allowing the remote tracking system to store weight value and the particular machine associated with the stored weight values.

It may be desirable limit or prevent persons from learning the weight values and associated machine identities, thus reducing the likelihood of those persons exploiting this information to steal the grain. In this regard, in some exemplary embodiments, the theft detection system includes an encryption module that encrypts the information or data associated with the weight value and machine identity prior to sending the information to the remote tracking system. As a result, the machine operators or any other unknown persons cannot access, without the proper key, the weight value and machine identity information of grain collected and transported during the harvesting operation.

Additionally, the communication systems described herein may include wireless communication. Moreover, some communications system include satellite data communication (e.g., Global Position System, or GPS, and Iridium Satellite Communications system). By providing satellite communication via a satellite data communication module, the theft detection system offers several advantages over cellular network communication. For example, the satellite communication is virtually available worldwide, whereas cellular networks are available in some regions but not others. Moreover, in regions where cellular network communication is available, the cellular network communication tends to be good in some locations but poor in other locations. Also, satellite data communication is particularly advantageous in rural areas commonly associated with farmland, as farmland tends to be relatively further from cellular network base stations as compared urban areas and other high-density population areas. Accordingly, users of the theft detection system described herein do not need to rely on less reliable communication protocols, such as cellular network communication.

In some examples, communication between devices as described herein may include, but is not limited to, (i) communication directly between a satellite data communication module or a device including a satellite data communication module (e.g., a satellite phone, smartphone, pager, or other ground-based communication device) and a satellite and/or (ii) communication that is routed through one or more ground-based communication towers (e.g., satellite communication towers or other ground-based satellite communication structures, cellular communication towers, etc.). For example, a first device may communicate directly with one or more satellites via a satellite data communication protocol, while the one or more satellites communicate with one or more second devices via one or more ground-based satellite communication towers, cellular communication towers, etc.

This detailed description refers to harvesting operations for grain, and accordingly, grain may come from various planted crops such as wheat, oats, rice, corn, sorghum, millet, rye, and barley, as non-limiting examples. However it should be noted in some examples, other harvestable crops may substitute for grain. As a result, this theft detection system may additionally apply to other harvested crops not specially discussed in this detailed description.

In some examples, the principles of the present disclosure may be implemented for other types of agricultural operations, including, but not limited to, seed planting operations (e.g., planting of granular seed), fertilizing operations (e.g., application of granular (dry) and/or liquid fertilizer), other chemical application operations (e.g., application of granular or liquid pesticides, herbicides, etc.). For example, instead of (or in addition to) preventing, detecting, and/or tracking theft of grain during harvesting, systems and methods of the present disclosure may be further configured to prevent, detect, and/or track theft of seed and other materials applied during planting and growing operations as described herein in more detail. In still other examples, the principles of the present disclosure may be implemented for tracking fuel extraction/transfer to/from agricultural machinery, fuel usage/consumption by the agricultural machinery, etc.

The present disclosure further includes an embodiment direct to ground-based crop spraying and/or seed application/spreader operations. For example, various planting and growing operations implement equipment including, but not limited to, sprayers (e.g., boom sprayers, airblast sprayers, etc.) and granular applicators or spreaders (e.g., applicators configured to distribute seed, granular fertilizer, granular herbicides or pesticides, etc.). In some examples, the equipment may be self-propelled. In other examples, the equipment may be towed behind a tractor or other equipment.

In some examples, the equipment may be operated by and/or under the control of an entity other than the owner/operator a target field, such as an employee operator, a third party vendor operator, etc. For example, agricultural material may be purchased, from a first entity, for application to a target field by the first entity or a second entity. In other words, a vendor of the agricultural material may be the same as or different from a vendor contracted to apply the agricultural material. Accordingly, the principles of the present disclosure may be implemented for tracking agricultural material provided by and/or applied by one or more third parties. As used herein, "agricultural material" may refer to various materials (e.g., liquid materials, granular or other solid materials, aerosolized materials, etc.) applied to crops or fields prior to, during, and/or subsequent to planting of seed, and may include, but are not limited to, granular seed, granular and/or liquid fertilizer, granular and/or liquid herbicides, granular and/or liquid pesticides, etc.

FIGS. 1A and 1B show an embodiment of a grain cart 100. The grain cart 100 is used to transport and temporarily store grain during a harvesting operation. As shown, the grain cart 100 includes a frame 101 and a grain bin 102 positioned on the frame 101. The grain bin 102 defines a volume for storing the grain. The grain cart 100 further includes a tongue or post 104 and a coupling unit 106 (located on the post 104) used to attach to a motorized vehicle (not shown in FIGS. 1A and 1B) that pulls the grain cart 100. Subsequent to receiving grain in the grain bin 102, the grain cart 100 is designed to offload the grain onto, for example, a trailer (shown later). In this regard, the grain cart 100 includes a tube 108 and an auger 109 (shown as dotted lines). While the tube 108 and the auger 109 are shown in a stored position, the tube 108 and the auger 109 can transition to a deployed position to offload grain from the grain bin 102 to the trailer. Although not shown, the grain cart 100 includes a motor used to rotationally drive the auger 109, such as a hydraulic motor driven by hydraulic fluid provided from the motorized vehicle.

In order to monitor grain, the grain cart 100 includes a theft detection system 110. The theft detection system 110 is designed to track grain, including the weight value or amount, onboarded into the grain bin 102. The "weight value" may refer to a numerical value associated with the weight measured in pounds or kilograms, as examples. Additionally, the theft detection system 110 can track grain, including the weight value offloaded from the grain bin 102 via the tube 108 and the auger 109. While the theft detection system 110 is shown as mounted to a particular location of the grain bin 102, the theft detection system 110 can be mounted to other locations of the grain bin 102 and the grain cart 100.

To determine the weight value, the theft detection system 110 may include a sensing device 112 in operational relationship with the grain bin 102. As shown in FIG. 1A, the grain gin 102 is positioned on the sensing device 112. When grain is disposed in the grain bin 102, the sensing device 112 can determine a weight value the grain bin 102. By subtracting a known weight value of the grain bin 102, the sensing device 112 can determine the weight value of the grain when the grain is loaded into the grain bin 102. As shown in FIG. 1B, the sensing device 112 is located in the grain bin 102. In some embodiments, the sensing device 112 includes a weight management system, such as a scale. However, the sensing device 112 may take other forms, which will be shown and described below.

The theft detection system 110 may include several communication modules used to receive and transmit information. For example, the theft detection system 110 may include a satellite data communication module used to transmit information or data associated with the weight value (provided by the sensing device 112) to a tracking system remotely located with respect to the grain cart 100. Additionally, the theft detection system 110 may include a short-range wireless communication module used to send information to, and/or receive information from, other machinery (shown and discussed below) used in the harvesting operation.

In some embodiments, the grain cart 100 includes a camera system 114 used to read identifying indicia from machinery used in the harvesting operation. Each indicia on the machinery can be specific to that particular machinery. Accordingly, the theft detection system 110 can determine which machines provide grain to the grain bin 102, and which machines receive grain from the grain bin 102. In addition to the weight value, the identified indicia can also be transmitted to the tracking system using the satellite data communication module. Also, prior to transmitting to the tracking system, the theft detection system 110 may include an encryption module used to encrypt the information or data related to the weight value and the identified indicia. These features will be shown and described in further detail below.

Figure 2:
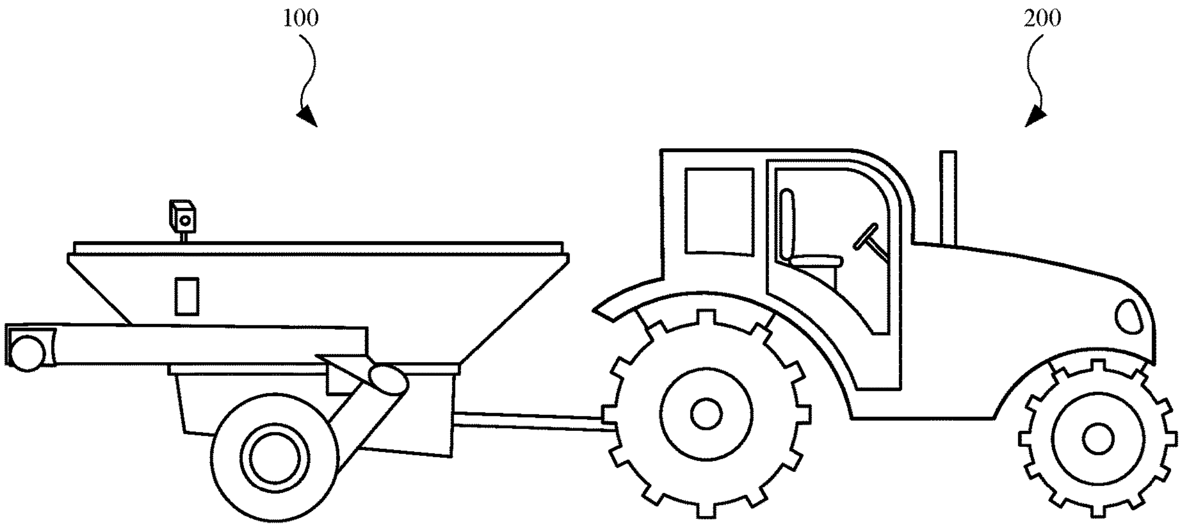
FIG. 2 shows an embodiment of a tractor used to haul the grain cart.

FIG. 2 shows an embodiment of a tractor 200 used to haul the grain cart 100. When connected to the grain cart 100, the tractor 200 can pull the grain cart 100 alongside a harvesting machine (not shown in FIG. 2). The tractor 200 is an exemplary machine, and other motorized vehicles can be used to haul the grain cart 100.

Figure 3A:
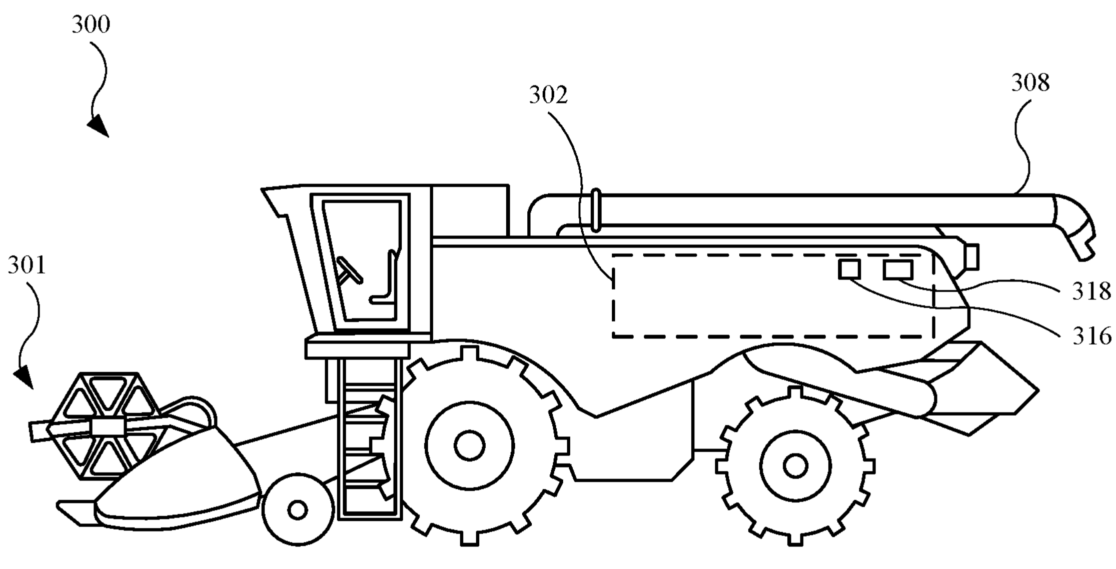
FIGS. 3A and 3B show an embodiment of a harvesting machine.
Figure 3B:
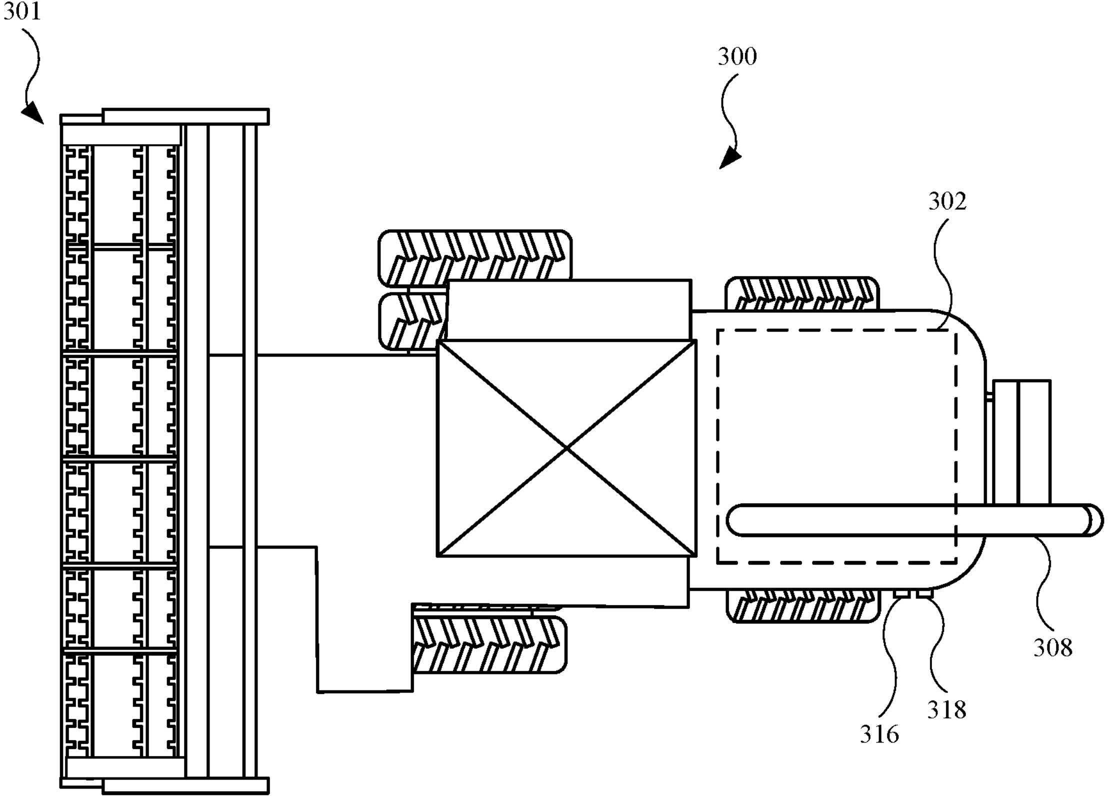

FIGS. 3A and 3B show an embodiment of a harvesting machine 300. The harvesting machine 300 can be referred to as a combine. The harvesting machine 300 is designed to retrieve, cut, and sort grain from the harvested crop. As shown, the harvesting machine 300 includes a head 301 having various parts (not labeled), such as a reel and a cutter bar. The head 301 may include a detachable head. In this manner, the head 301 can be substituted with one or more different heads having different sizes and different components based on the type of grain. The harvesting machine 300 further includes a grain bin 302 used as a volume to store grain. Although not shown, the harvesting machine 300 may include a conveyor belt used to transport the grain from the head 301 to the grain bin 302. In order to remove the grain from the grain bin 302, the harvesting machine includes a tube 308 and an auger (not shown in FIGS. 3A and 3B) used to extract the grain from the grain bin 302 to, for example, a grain bin (e.g., grain bin 102 shown in FIG. 1A). Additionally, in some embodiments, the harvesting machine 300 includes an indicium 316 used to identify the harvesting machine 300. In this regard, the indicium 316 may be unique to the harvesting machine 300 such that the harvesting machine 300 can be distinguished from other harvesting machines. Referring to the grain cart 100 in FIGS. 1A and 1B, the camera system 114 can read an indicium (such as the indicium 316) and provide, to the theft detection system 110, information related to the indicium. Additionally, in some embodiments, the harvesting machine 300 includes a communication module 318 used to receive and/or transmit short-range wireless communication. Referring again to the grain cart 100 in FIGS. 1A and 1B, the theft detection system 110, also having communication capabilities, can retrieve information from the communication module 318, such as a weight value of grain in the grain bin 302 (as determined by the harvesting machine 300 prior to an onboarding event), authentication information used to verify the harvesting machine 300 (including an expected harvesting machine during a harvesting operation), a time stamp associated with initiation of onboarding event, and/or a time duration associated with the time taken for the onboarding event.

Figure 4:
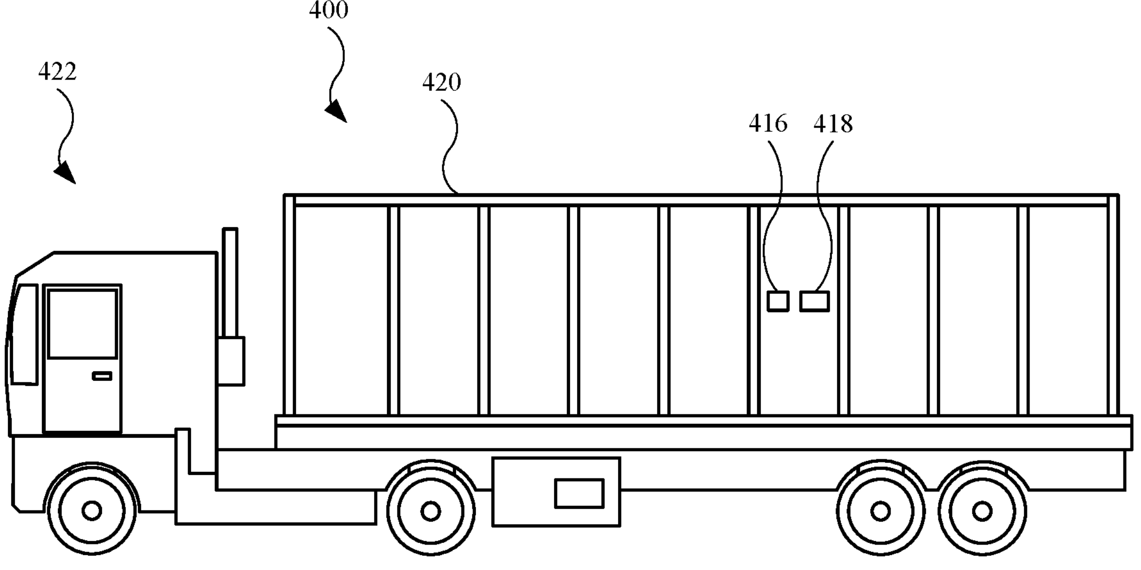
FIG. 4 shows an embodiment of a trailer.

FIG. 4 shows an embodiment of a trailer 400. The trailer 400 can be used as an offload container for offloading grain from a grain cart. As shown, the trailer 400 includes a container 420 used as a volume to store the grain. Also, the trailer 400 is connected to a semi-truck 422 used to haul the trailer 400. In an example harvesting operation, the trailer 400 cam remain stationary until a grain cart and tractor (not shown in FIG. 4) arrive alongside the trailer 400. Subsequent to an offloading event of grain into the trailer 400, the semi-truck 422 can haul the trailer 400 (filled with grain) to a storage facility. The semi-truck 422 is an exemplary machine, and other motorized vehicles can be used to haul the trailer 400.

In some embodiments, the trailer 400 includes an indicium 416 used to identify the trailer 400. In this regard, the indicium 416 may be unique to the trailer 400 such that the trailer 400 can be distinguished from other trailers. Referring to the grain cart 100 in FIGS. 1A and 1B, the camera system 114 can read an indicium (such as the indicium 416) and provide, to the theft detection system 110, information related to the indicium. Additionally, in some embodiments, the trailer 400 includes a communication module 418 used to receive and/or transmit short-range wireless communication. Referring again to the grain cart 100 in FIGS. 1A and 1B, the theft detection system 110, also having communication capabilities, can retrieve information from the communication module 418, such as a weight value of grain in the container 420 subsequent to an offloading event, authentication information used to verify the trailer 400, a time stamp associated with offloading event, and/or a time duration associated with offloading event.

Figure 5:
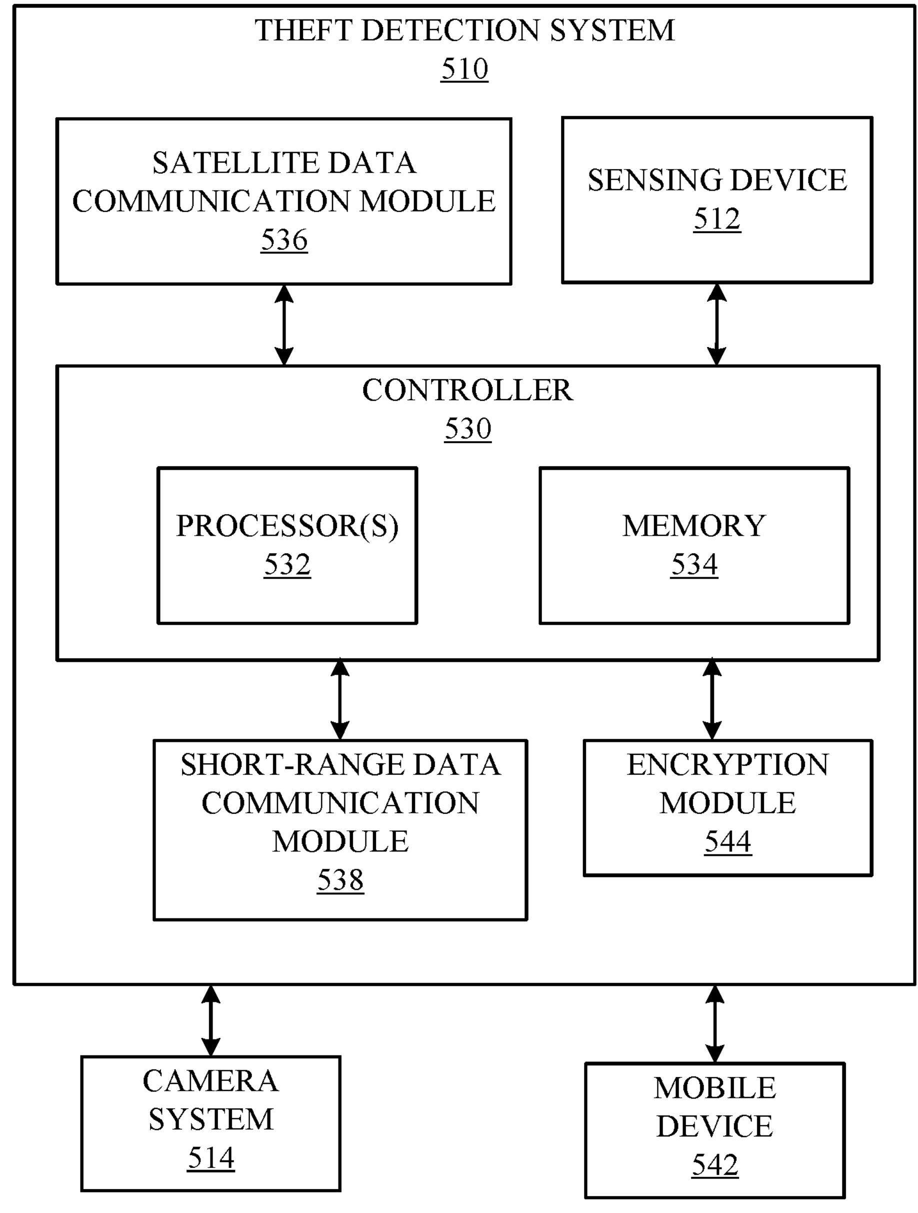
FIG. 5 shows a schematic diagram of a theft detection system, in accordance with some described embodiments.

FIG. 5 shows a schematic diagram of a theft detection system 510, in accordance with some described embodiments. Other theft detection systems (e.g., the theft detection system 110, shown in FIGS. 1A and 1B) may include any features described herein for the theft detection system 510. The theft detection system 510 can be mounted to farm equipment, such as grain carts (e.g., the grain cart 100) described herein.

The theft detection system 510 may include a controller 530 used to receive communication from input devices and use the communication to output controls or commands to other devices. The controller 530 may include a programmable logic controller or one or more microcontrollers, as non-limiting examples. The controller 530 may include one or more processors 532 and memory 534. When the controller 530 is implemented as a processor 532 and memory 534, the one or more processors 532 are designed to execute instructions or algorithms stored on the memory 534, which may include random access memory or read-only memory. While components of the theft detection system 510 are shown within a same schematic representation of the theft detection system 510, one or more of the components may be located at various locations remote from one another (e.g., in different locations of the grain cart 100). Further, although shown separate from the theft detection system 510, the camera system 514 (and/or other components, such as the mobile device 542) may be characterized, in some examples, as components of the theft detection system 510.

The theft detection system 510 may further include a sensing device 512 operatively coupled to the controller 530. The sensing device 512 is designed to determine a weight value (i.e., amount of grain) in a grain bin of the grain cart. In this regard, the sensing device 512 can determine a weight value of the grain during an onboarding event, and provide the weight value information to the controller 530. Accordingly, based on the determined weight value by the sensing device 512, the theft detection system 510 can determine the weight value of the grain to be provided from the grain cart to the trailer during an offloading event. Several exemplary embodiments of the sensing device are shown and described below.

The theft detection system 510 may further include a satellite data communication module 536 operatively coupled to the controller 530. The satellite data communication module 536 may rely upon satellite data communication protocol, such as the Iridium Satellite Communications system, to transmit information. When directed by the controller 530, the satellite data communication module 536 is designed to transmit information to a tracking system (e.g., a server, including cloud-based server, a database, or a computing system). The satellite data communication module 536 can provide the weight value information of grain, as determined by the sensing device 512, to the tracking system. Additionally, the satellite data communication module 536 can also provide indicia information of machinery (e.g., harvesting machine and/or trailer), as determined by a camera system 514 communicatively coupled to the controller 530.

The theft detection system 510 may further include a short-range data communication module 538. The short-range data communication module 538 communicates over short-range communication protocols, such as BLUETOOTH® or WIFI®, as non-limiting examples. The short-range data communication module 538 is designed to communicate with communication modules (e.g., communication module 318 of the harvesting machine 300 in FIGS. 3A and 3B, and communication module 418 of the trailer 400 in FIG. 4). As non-limiting examples, the received communication may include identifying indicia of the harvesting machine, a weight value of grain in a grain bin of a harvesting machine prior to an onboarding event, identifying indicia of a trailer, a weight value of grain in grain bin of a trailer subsequent to an offloading event, a time stamp associated with initiation of the onboarding or offboarding events, and/or a time duration associated with the onboarding or offboarding events.

Alternatively, or in combination, the short-range data communication module 538 can determine identifying information of the harvesting machine and/or the trailer by communicating with mobile devices, including mobile wireless communication devices (e.g., smartphones) that also include short-range wireless communication modules operating over short-range communication protocols. For example, when an operator (i.e., driver) of a harvesting machine carries a mobile device 542, the mobile device 542 can store identification information that is unique to the harvesting machine. The theft detection system 510 can use the short-range data communication module 538 to communicate with the mobile device 542 and receive the unique identification information. While an example for an operator of a harvesting machine is given, an operator of a semi-truck hauling the trailer may also carry a mobile device similar to the mobile device 542, and accordingly, the short-range data communication module 538 can receive identification information from the operator of the semi-truck hauling the trailer that is unique to the trailer.

In order to prevent persons (including vehicle operators of the harvesting machines, farmhand/laborers, and/or other nefarious actors) from gaining knowledge of the weight values of the grain, the theft detection system 510 may further include an encryption module 544 operatively coupled to the controller 530. Prior to the satellite data communication module 536 providing information to the tracking system, the encryption module 544 can use an encryption algorithm (e.g., private key or public key encryption) to encrypt the information. In either encryption algorithm, the key is shared with the tracking system, and if desired, shared with only trusted personnel.

The theft detection system 510 can use the received information to monitor and detect grain theft in a number of ways. For example, prior to an onboarding event, the theft detection system 510 receives a weight value of grain, using the short-range data communication module 538, from a communication module of a harvesting machine. Additionally, the theft detection system 510 receives a weight value, using the sensing device 512, onboarded onto the grain cart. Processor 532 can execute instructions stored on the memory 534 to compare and determine the difference between the weight values. If the difference between the weight values is greater than a predetermined threshold, then the controller 530 can generate and transmit a notification, using the satellite data communication module 536, to a tracking system. For example, a notification may include an alarm or alert indicating an unexpected difference (i.e., exceeded predetermined threshold) in grain has been detected, which may correspond to grain theft. Accordingly, the notification may indicate that grain was stolen during the onboarding event.

In another example, the theft detection system 510 receives a weight value of grain, using the sensing device 512, disposed in the grain cart. Subsequent to an offloading event, the theft detection system 510 can obtain a weight value of grain, using the short-range data communication module 538, from a communication module of a trailer. The processor 532 can again execute instructions stored on the memory 534 to compare and determine the difference between the weight values, and if the difference between the weight values is greater than a predetermined threshold, then the controller 530 can generate and transmit a notification, using the satellite data communication module 536, to the tracking system, indicating that grain was stolen during the offloading event.

Further, in some embodiments, the theft detection system 510 uses the short-range data communication module 538 to receive respective weight values of grain provided by the harvesting machine and by the trailer, and determines the difference between the weight values. If the difference between the weight values is greater than a predetermined threshold, then the controller 530 can generate and transmit a notification, using the satellite data communication module 536, to the tracking system. The notification may indicate that grain was stolen during one or more of the onboarding or offloading events, or was stolen while the grain was disposed in the grain cart (independently of the onboarding or offloading events). Accordingly, the theft detection system 510 is designed to monitor and compare the weight values at the multiple, different stages.

In some embodiments, the "predetermined threshold" is based on a predetermined weight difference, such as a value between 50 to 100 pounds (or 22.7 to 45.4 kilograms, respectively). In this regard, the notification is generated and transmitted when the weight difference between two weight values is greater than the predetermined weight difference (i.e., greater than 50 to 100 pounds). Alternatively, in some embodiments, the "predetermined threshold" is based on a percent difference. For example, an initial weight value (e.g., in the harvesting machine prior to the onboarding event, or in the grain cart prior to the offloading event) may be defined as "100%" of the grain, and when a subsequent weight value is (e.g., after the onboarding event into the grain cart, or after the offloading event into the trailer) is a percentage below a predetermined threshold percentage (e.g., 5% to 10% below), then the controller 530 can generate and transmit the notification to the tracking system.

Further, in some embodiments, the theft detection system 510 uses the sensing device 512 to continually monitor a cumulative weight value of grain in a grain bin. As a result, the theft detection system 510 can determine in real-time a weight value of grain in the grain bin during onboarding and offloading events, which can be advantageously used in several ways. For example, during an offloading event, the theft detection system 510 can continually monitor a cumulative weight value of grain in a grain bin, and when the theft detection system 510 does not receive a trailer identity from a trailer onto which the grain is to be offloaded, the theft detection system 510 can transmit a notification to the tracking system. The notification may indicate the grain is being offloaded to an unauthorized trailer or other unauthorized container. Also, the theft detection system 510 can continually monitor a cumulative weight value of grain in a grain bin, and in the absence of any type of onboarding or offloading event, if the cumulative weight of grain in the grain bin decreases, then the theft detection system 510 can transmit a notification to the tracking system. The notification may indicate the grain is being taken from the grain cart without authorization.

In some embodiments, the theft detection system 510 uses the short-range data communication module 538 to receive an expected weight value of grain and then compares the expected weight value with an actual weight value determined by the sensing device 512. For example, prior to an onboarding event, the theft detection system 510 can receive an expected weight value from a harvesting machine indicating a weight value of grain to be onboarded to a grain cart. Then, subsequent to the onboarding event, the theft detection system 510 can determine the actual weight value of grain received from the harvesting machine. The theft detection system 510 can then compare the expected and actual weight values, and provide a notification to the tracking system when the difference between the expected and actual weight values is greater than a predetermined threshold. Similarly, prior to an offloading event, the theft detection system 510 can determine an initial weight value of grain in the grain bin that is to be offloaded to the trailer. Then, subsequent to the offloading event, the theft detection system 510 can receive a final weight value from the trailer indicating a weight value of grain that was offloaded from the grain cart to the trailer. The theft detection system 510 can then compare the initial and final weight values, and provide a notification to the tracking system when the difference the initial and final weight values is greater than a predetermined threshold.

As described, the theft detection system 510 can be used to determine potential grain theft events and generate notifications to the tracking system. However, in some embodiments, the theft detection system 510 is designed to track/record various weight values, track/record various harvester and trailer identities, and transmit this information to the tracking system, thereby allowing the tracking system to determine grain theft events. In other words, the theft detection system 510 can be used without determining potential grain theft events and without generating notifications, and can simply provide information to the tracking system.

Figure 6A:
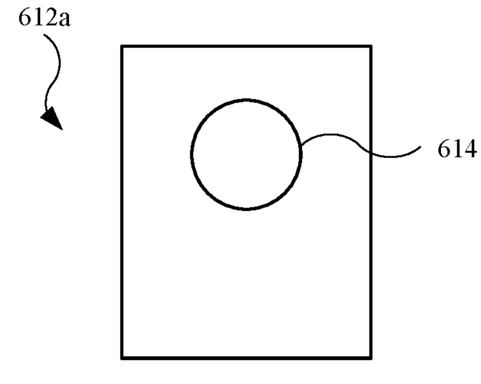
FIGS. 6A-6C show various embodiments of a sensing device.
Figure 6B:
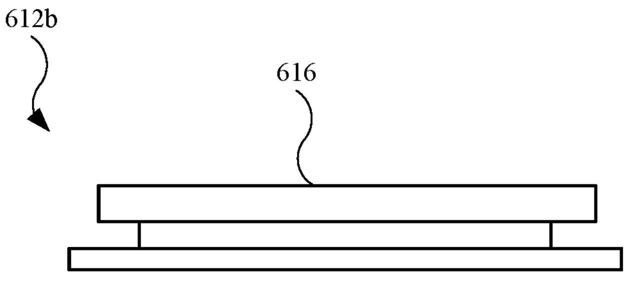
Figure 6C:
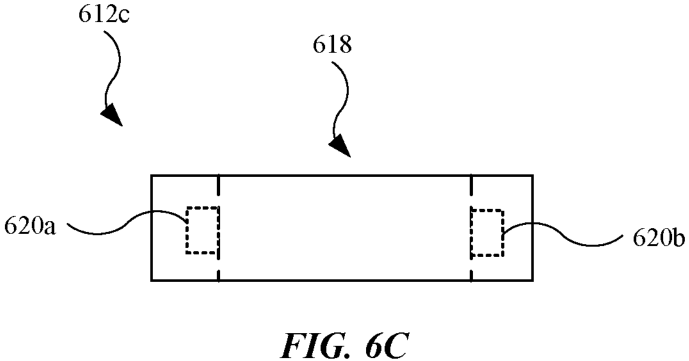

FIGS. 6A-6C show various embodiments of a sensing device. The sensing devices shown and described in FIGS. 6A-6C are exemplary sensing devices that may be placed on the grain cart and communicatively coupled to a theft detection system described herein. FIG. 6A shows a sensing device **612*a* in the form of an image sensing device. In this manner, the sensing device 612*a* includes an image detector 614 used to monitor a grain bin, and determine an image of the grain in the grain bin. In some embodiments, the image is converted into a three-dimensional image. Using volume information of the grain bin, the sensing device 612*a*** can determine a weight value of the grain.

FIG. 6B shows a sensing device **612*b* in the form of a weight management system. In this manner, the sensing device 612*b* may include a weight sensor or scale used to measure force applied to a platform 616, and convert the measured force into a weight value. In order to measure the force, the sensing device 612*b*** may use features such as a strain gauge, a piezoelectric sensor, or other pressure-sensitive component, as non-limiting examples.

FIG. 6C shows a sensing device **612*c* in the form of a flow rate sensor. The sensing device 612*c* may include an opening 618 through which grain passes. The sensing device 612*c* may further include a transmitter 620*a* that transmits light and a receiver 620*b* used to at least partially receive light from the transmitter 620*a*. As grain passes through the opening, the grain partially blocks the light from the transmitter 620*a*, and sensing device 612*c* can determine a flow based upon the amount of light received by the receiver 620*b*. The flow rate is inversely proportional to light received at the receiver 620*b*, and accordingly, the flow rate is greater for less light received. The sensing device 612*c*** can determine the weight value based upon the flow rate and additional information, such as density and moisture content.

FIGS. 7A-7E show various embodiments of indicia used to identify machinery. The indicia shown and described in FIGS. 7A-7E are exemplary indicia that may be placed on a harvesting machine and/or a trailer in a location visible and readable by a camera system communicatively coupled to a theft detection system described herein. FIG. 7A shows an indicium **716*a* in the form of a number. The number may be unique to a harvesting machine and/or to a trailer. FIG. 7B shows an indicium 716*b* in the form of alphanumeric elements. As shown, the indicium 716*b* may include both letters (forming a word) and numbers used uniquely identify a harvesting machine and/or to a trailer. In some embodiments, the number is removed and the indicium 716*b* in word form only. FIG. 7C shows an indicium 716*c* in the form of a one-dimensional bar code. The indicium 716*c* represents a Universal Product Code ("UPC"). However, it should be noted that several other one-dimensional product codes are possible. FIG. 7D shows an indicium 716*d* in the form of a two-dimensional bar code. As shown, the indicium 716*d* includes a data matrix code. FIG. 7E shows an alternate embodiment of an indicium 716*e* in the form of a two-dimensional bar code. As shown, the indicium 716*e*** includes a quick response ("QR") code. It should be noted that several other two-dimensional product codes are possible.

Figure 8:
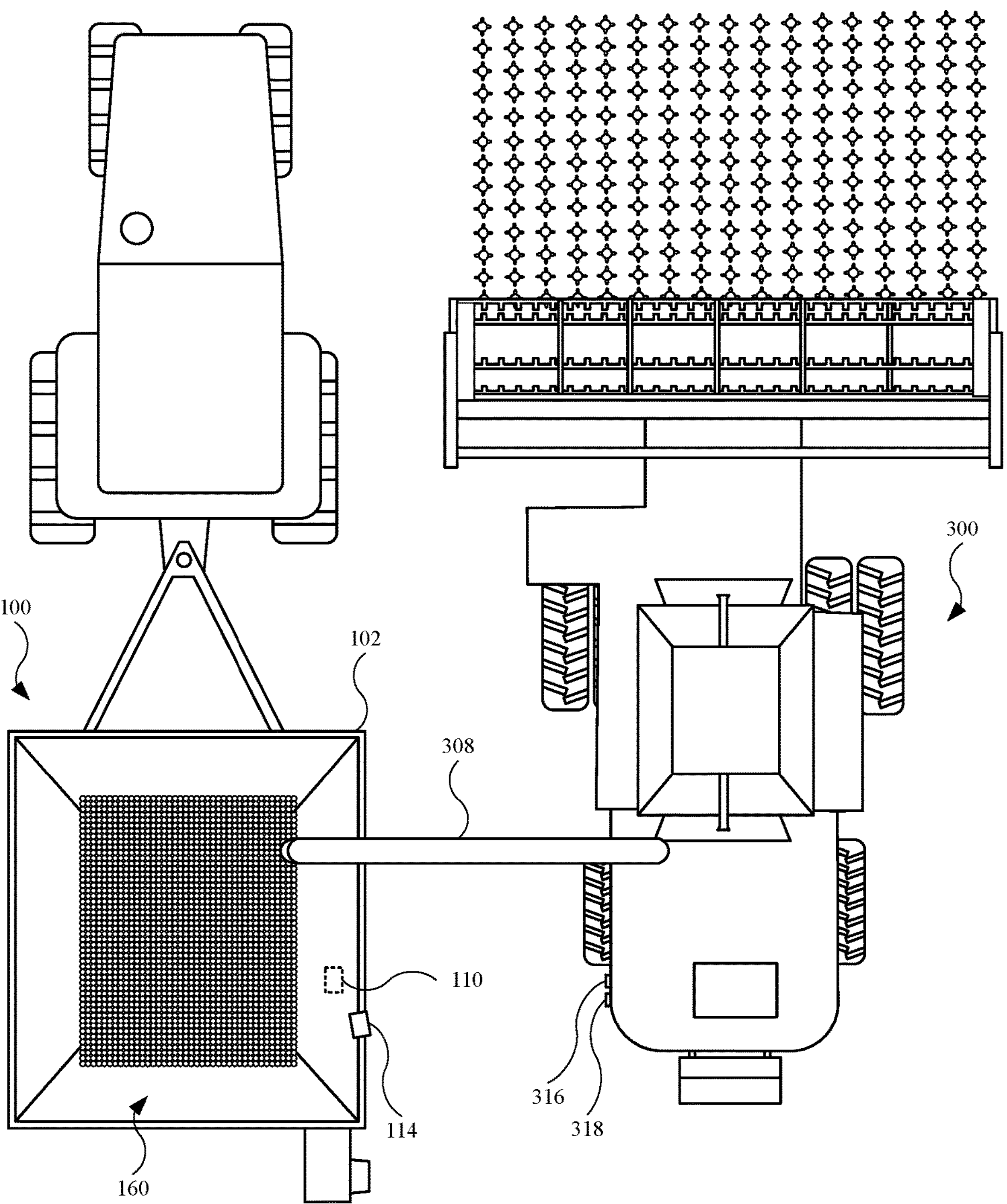
FIG. 8 shows an aerial view of a harvesting machine unloading grain onto a grain cart, in accordance with some described embodiments.

FIG. 8 shows an aerial view of a harvesting machine 300 unloading grain 160 onto a grain cart 100, in accordance with some described embodiments. As shown, the tube 308 of the harvesting machine 300 is extended/deployed and positioned over the grain bin 102, and grain 160 is being onboarded to the grain bin 102 from the harvesting machine 300. The theft detection system 110 can use the sensing device (e.g., sensing device 112 shown in FIG. 1A) to determine a weight value of the grain 160 in the grain bin 102. Additionally, based on the relationship between the grain cart 100 and the harvesting machine 300, the camera system 114 is able to read the indicium 316 located on the harvesting machine 300, and a short-range wireless communication module (e.g., short-range data communication module 538 shown in FIG. 5) is within range to communicate with the communication module 318 of the harvesting machine 300.

Figure 9:
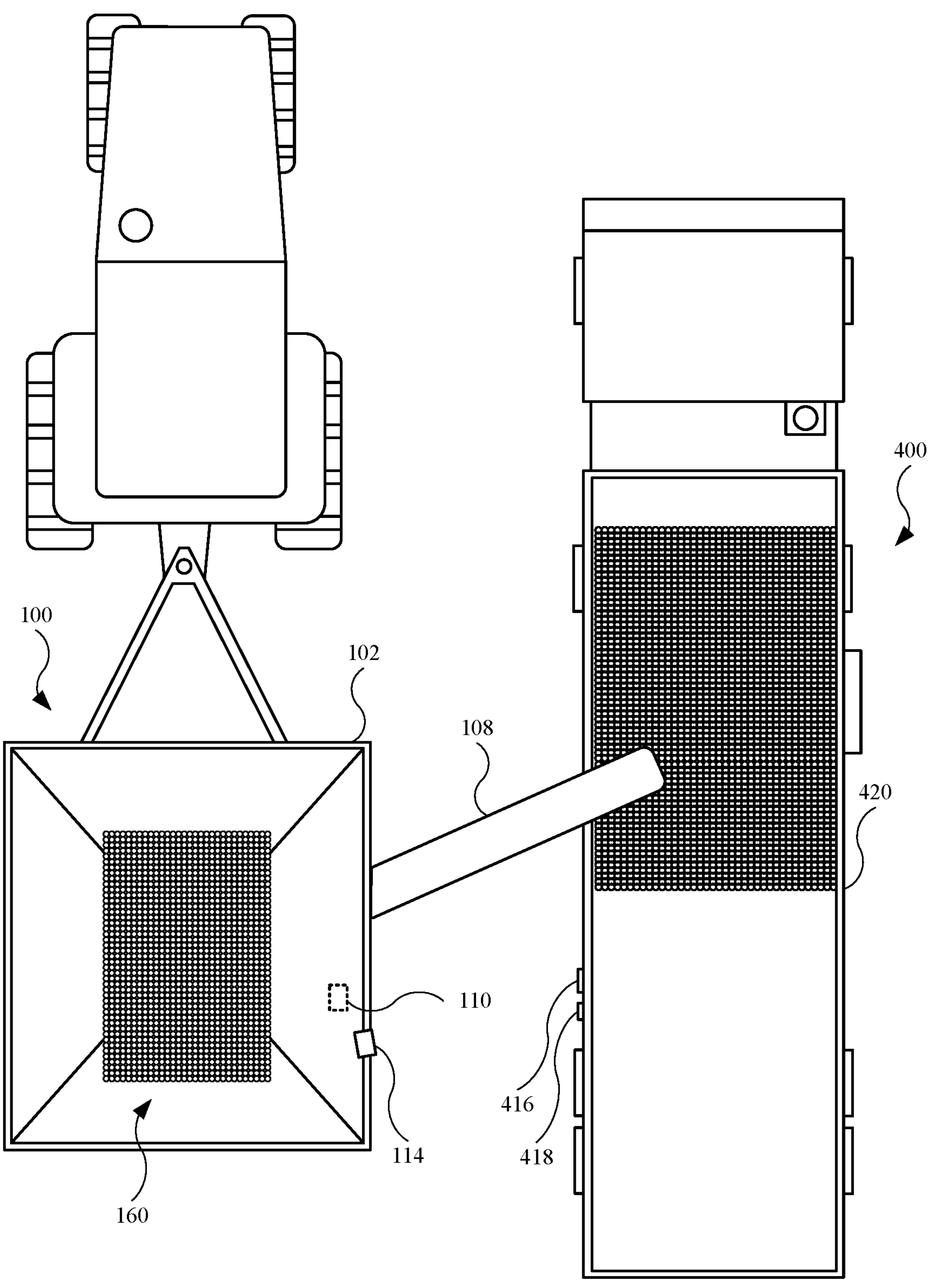
FIG. 9 shows an aerial view of a grain cart unloading grain onto a trailer, in accordance with some described embodiments.

FIG. 9 shows an aerial view of a grain cart 100 unloading grain 160 onto a trailer 400, in accordance with some described embodiments. As shown, the tube 108 of the grain cart 100 is extended/deployed and positioned over the container 420 of the trailer 400, and grain 160 is being offloaded from the grain bin 102 to the container 420. The theft detection system 110 can use the sensing device (e.g., sensing device 112 shown in FIG. 1A) to determine a weight value of the grain 160, including continuously monitoring the weight value during the offloading event. Additionally, based on the relationship between the grain cart 100 and the trailer 400, the camera system 114 is able to read the indicium 416 located on the trailer 400, and a short-range wireless communication module (e.g., short-range data communication module 538 shown in FIG. 5) is within range to communicate with the communication module 418 of the trailer 400.

Figure 10:
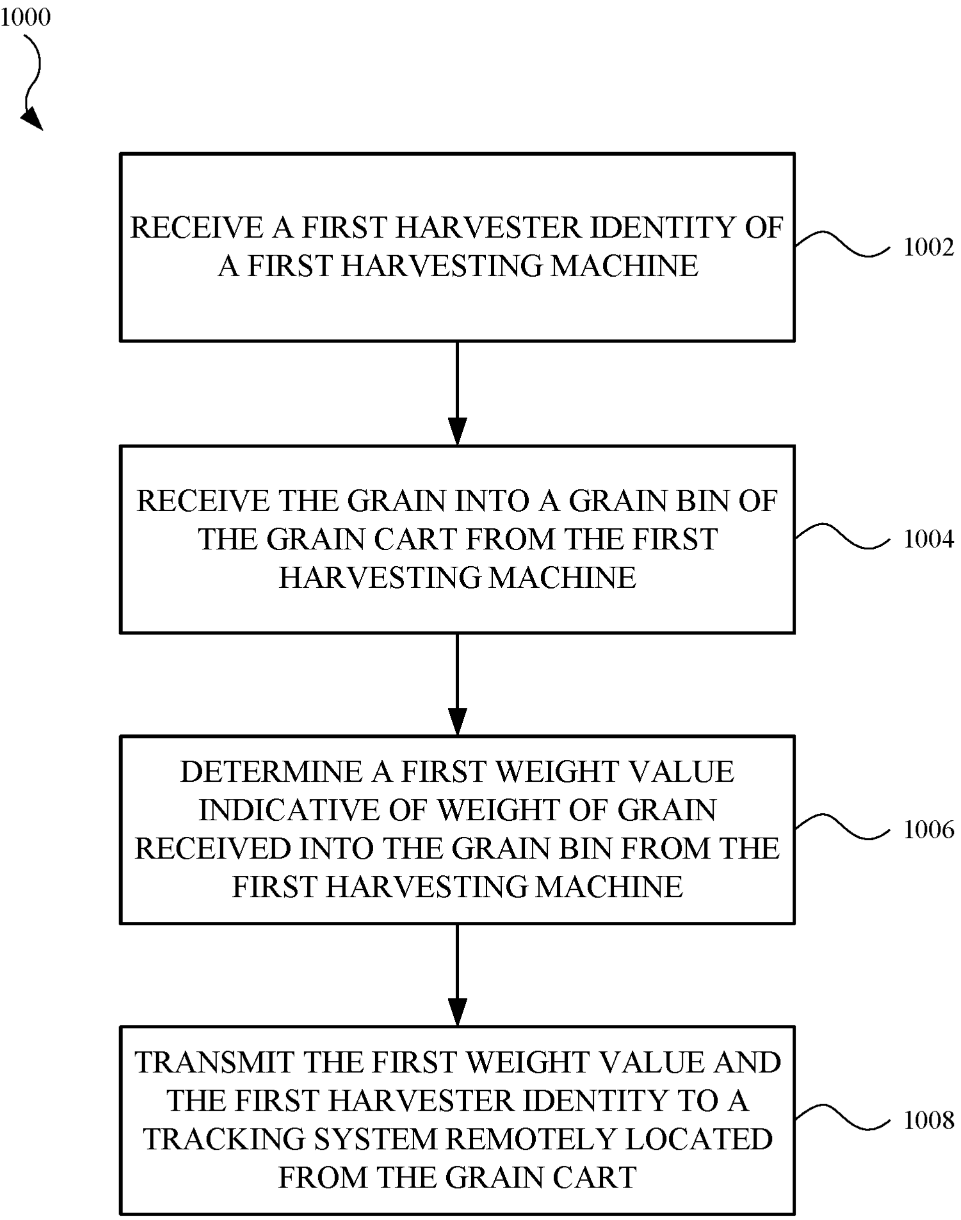
FIG. 10 shows a method for transferring grain in a harvesting operation.

FIG. 10 shows a method 1000 for transferring grain in a harvesting operation, in accordance with some described embodiments. The steps of the method 1000 can be performed by a theft detection system described herein.

In step 1002, a first harvester identity of a first harvesting machine is received. A theft detection system, disposed on a grain cart, can receive the first harvester identity. In some embodiments, the theft detection system includes a short-range wireless communication module used to communicate and received the first harvester identity from a communication module on the first harvesting machine. In some embodiments, the theft detection system uses a camera system (disposed on the grain cart) used to read indicia that identifies the first harvesting machine. As non-limiting examples, the indicia may include a number visible on the first harvesting machine, a bar code (one- or two-dimensional) disposed on the first harvesting machine, and a word visible on the first harvesting machine. Additionally, in some embodiments, the theft detection system can communicate with a mobile device of an operator of the first harvesting machine to determine the first harvester identity.

In step 1004, the grain is received into a grain bin of the grain cart from the first harvesting machine. The first harvesting machine may include a tube and auger used to remove the grain from the first harvesting machine and onboard the grain into the grain bin of the grain cart.

In step 1006, a first weight value indicative of weight of grain received into the grain bin from the first harvesting machine is determined. In order to determine the first weight value, the grain cart may include a sensing device disposed on the grain cart and communicatively coupled to the theft detection system, including a controller of the theft detection system. As non-limiting examples, the sensing device may include an image sensing device, a weight management system, or a flow rate sensor. Using the sensing device, the theft detection system can determine an amount of grain received from the first harvesting machine.

In step 1008, the first weight value and the first harvester identity are transmitted to a tracking system remotely located from the grain cart. The tracking system may take the form of any number of remote systems, such as a remote server (including a cloud-based server), a database, or a computing system. In order to transmit the first weight value and the first harvester identity, the theft detection system may include a satellite data communication module that transmits via satellite data communication protocol. Additionally, in order to prevent persons from obtaining the first weight value and the first harvester identity, the theft detection system may include an encryption module that encrypts data related to the first weight value and the first harvester identity, thereby allowing the satellite data communication module to transmit the data at least partially in an encrypted form.

While the systems and methods described above relate to harvesting operations (e.g., harvesting grain using a harvester, transferring grain from the harvester to a grain cart, transferring grain from the grain cart to a trailer, etc.), the principles of the present disclosure may also be implemented for planting operations and growing operations. In this manner, the principles of the present disclosure may be implemented to prevent, detect, and/or track theft of seed and other materials applied during planting and growing operations as described below in more detail.

For example, planting operations may include, but are not limited to, transferring seed from a trailer or other storage or transportation mechanism to a seed tender (which may in some examples, correspond to a grain cart or modified grain cart or a dual purpose grain cart/seed tender), transferring seed from the seed tender to a planter/spreader, distributing seed using the planter/spreader, etc. In some examples, planting operations may include transportation, delivery, and/or application of seed by one or more third party vendors or other entities using respective equipment, which may be self-propelled or tow-behind equipment.

Similarly, growing operations may include, but are not limited to, transferring granular fertilizer from a trailer or other storage or transportation mechanism to a fertilizer tender (which may in some examples, correspond to a grain cart or seed tender, a modified grain cart or seed tender, etc.), transferring granular fertilizer from the fertilizer tender to a spreader, distributing granular fertilizer using the spreader, etc.

Other growing operations may include, but are not limited to, transferring liquid fertilizer or other liquids (e.g., liquid pesticides, herbicides, etc., collectively referred to herein, along with liquid fertilizer, as agrochemicals) from a trailer or other storage or transportation mechanism to an agrochemical tender, transferring agrochemicals from the agrochemical tender to a sprayer (e.g., a boom sprayer, a boomless sprayer, a tank sprayer, a tow-behind sprayer or sprayer attachment, etc.) distributing agrochemicals using the sprayer, etc. In some examples, growing operations may include transportation, delivery, and/or application of liquid or granular material by one or more third party vendors or other entities using respective equipment, which may be self-propelled or tow-behind equipment.

While the above example operations include multiple storage and transportation mechanisms, in other examples one or more mechanisms may be omitted while still implementing the principles of the present disclosure. For example, for planting operations, seed may be transferred directly from a trailer or other storage or transportation mechanism to the planter/spreader, manually transferred from bags of seed to the planter/spreader, etc. As one example, principles of the present disclosure as described below may be implemented for pallets, trailers, truck beds, etc. containing bags of granular seed or fertilizer and/or containers of agrochemicals. In some examples, same or similar machinery may be used for two or more of the described harvesting, planting, and growing operations. For example, for final application of seed or agrochemicals, a same agricultural machine or tractor may be used with different types of attachments (e.g., spreaders, sprayers, etc.) for respective operations.

As used in the present disclosure, the terms "equipment" and "machine" may generally refer to any machinery, equipment, etc. described herein, such as a trailer, container, or other storage, seed or fertilizer tender, planter/spreader, sprayer, tractor, tractor attachment, etc.

Further, while generally described below with respect to preventing, detecting, and/or tracking theft of seed and other materials during planting and growing operations, systems and methods of the present disclosure may be implemented for monitoring application and distribution of agricultural materials (seed, granular and/or liquid fertilizer, herbicides, pesticides, etc.) during planting and growing operations. For example, amounts of seed planted by a planter (e.g., seed counts), fertilizer sprayed or distributed (e.g., volume sprayed per acre), etc. can be determined using the principles of the present disclosure.

Figure 11A:
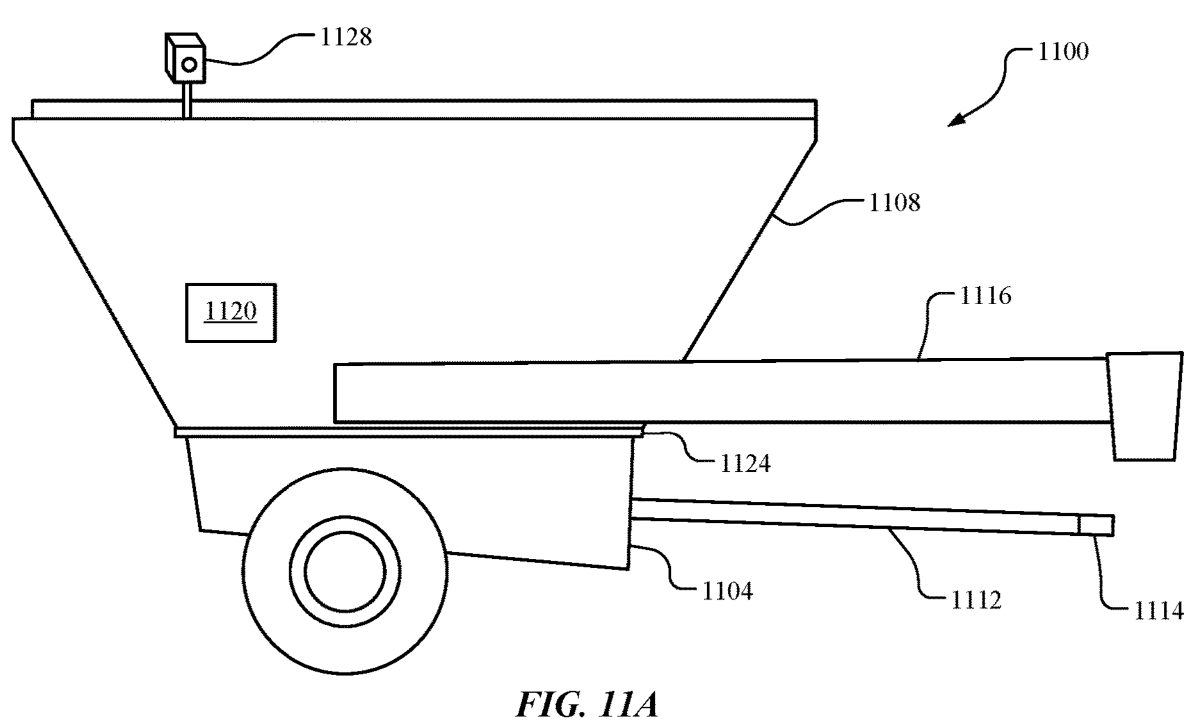
FIGS. 11A and 11B show an example seed tender or cart according to the present disclosure.
Figure 11B:
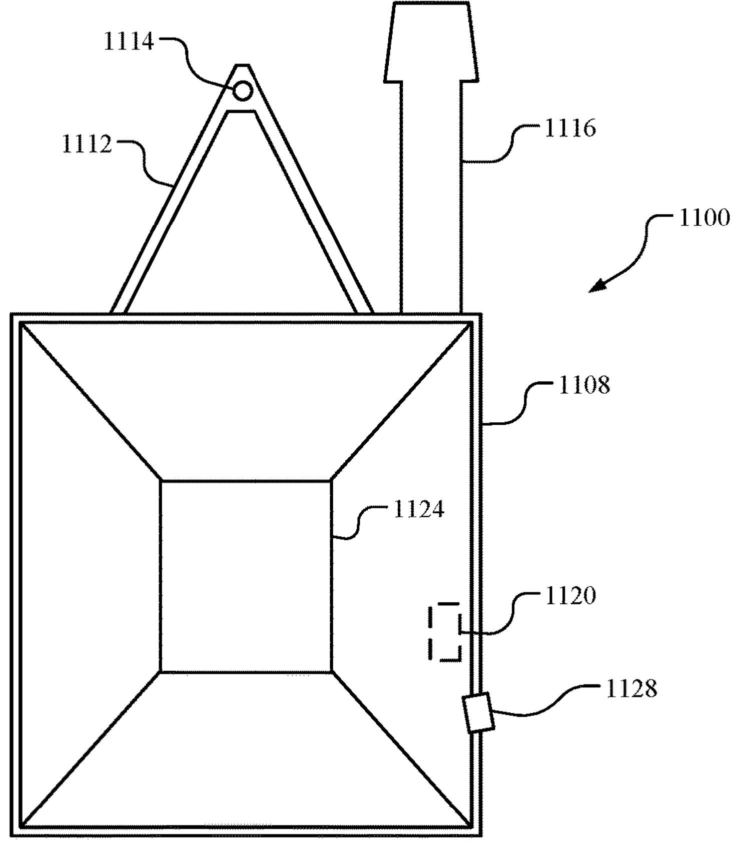

FIGS. 11A and 11B show an example seed tender or cart 1100. While described below as a seed tender, the general operation and structure of a granular fertilizer tender may be similar to the seed tender 100. Accordingly, the principles of the present disclosure as described below with respect to the seed tender 1100 may be implemented with respect to a granular fertilizer tender.

The seed tender 1100 is used to transport and temporarily store seed during a planting operation. As shown, the seed tender 1100 includes a frame 1104 and a seed bin or hopper 1108 positioned on the frame 1104. The seed bin 1108 defines a volume for storing the seed. The seed tender 1100 further includes a tongue or post 1112 and a coupling unit 1114 (located on the post 1112) used to attach to a motorized vehicle (such as the tractor 200 shown in FIG. 2) that pulls the seed tender 1100. Subsequent to receiving seed in the seed bin 1108, the seed tender 1100 is configured to offload the seed into, for example, a seed spreader or planter. In this regard, the seed tender 1100 includes a tube 1116, which may include an auger and/or conveyor mechanism similar to the grain cart 100 described above. While the tube 1116 is shown in a stored position, the tube 1116 can transition to a deployed position to offload seed from the seed bin 1108 to the planter. In some examples, the tube 1116 may be configured to extend/telescope. Although not shown, the seed tender 1100 includes a motor used to rotationally drive the auger and/or conveyor, such as a hydraulic motor driven by hydraulic fluid provided from the motorized vehicle.

In order to monitor seed, the seed tender 1100 includes a theft detection system 1120 (shown schematically). The theft detection system 1120 is designed to track seed, including the weight value or amount, onboarded into the seed bin 1108. The "weight value" may refer to a numerical value associated with the weight measured in pounds or kilograms, as examples. Additionally, the theft detection system 1120 can track seed, including the weight value offloaded from the seed bin 1108 via the tube 1116. While the theft detection system 1120 is shown as mounted to a particular location of the seed bin 1108, the theft detection system 1120 can be mounted to other locations of the seed bin 1108 and the seed tender 1100.

To determine the weight value, the theft detection system 1120 may include a sensing device 1124 in operational relationship with the seed bin 1108. As shown in FIG. 11A, the seed bin 1108 is positioned on the sensing device 1124. When seed is disposed in the seed bin 1108, the sensing device 1124 can determine a weight value the seed bin 1108. By subtracting a known weight value of the seed bin 1108, the sensing device 1124 can determine the weight value of the seed when the seed is loaded into the seed bin 1108. As shown in FIG. 11B, the sensing device 1124 is located in the seed bin 1108. In some embodiments, the sensing device 1124 includes a weight management system, such as a scale. However, the sensing device 1124 may take other forms as described above in FIGS. 6A-6C.

The theft detection system 1120 may include several communication modules used to receive and transmit information. For example, the theft detection system 1120 may include a satellite data communication module used to transmit information or data associated with the weight value (provided by the sensing device 1124) to a tracking system remotely located with respect to the seed tender 1100. Additionally, the theft detection system 1120 may include a short-range wireless communication module used to send information to, and/or receive information from, other machinery (shown and discussed below) used in the planting operation.

In some embodiments, the seed tender 1100 includes a camera system 1128 used to read identifying indicia from machinery used in the planting operation. Each indicia on the machinery can be specific to that particular machinery. Accordingly, the theft detection system 1120 can determine which machines provide seed to the seed bin 1108 and which machines receive seed from the seed bin 1108. In addition to the weight value, the identified indicia can also be transmitted to the tracking system using the satellite data communication module. Also, prior to transmitting to the tracking system, the theft detection system 1120 may include an encryption module used to encrypt the information or data related to the weight value and the identified indicia.

Figures 12A, 12B:
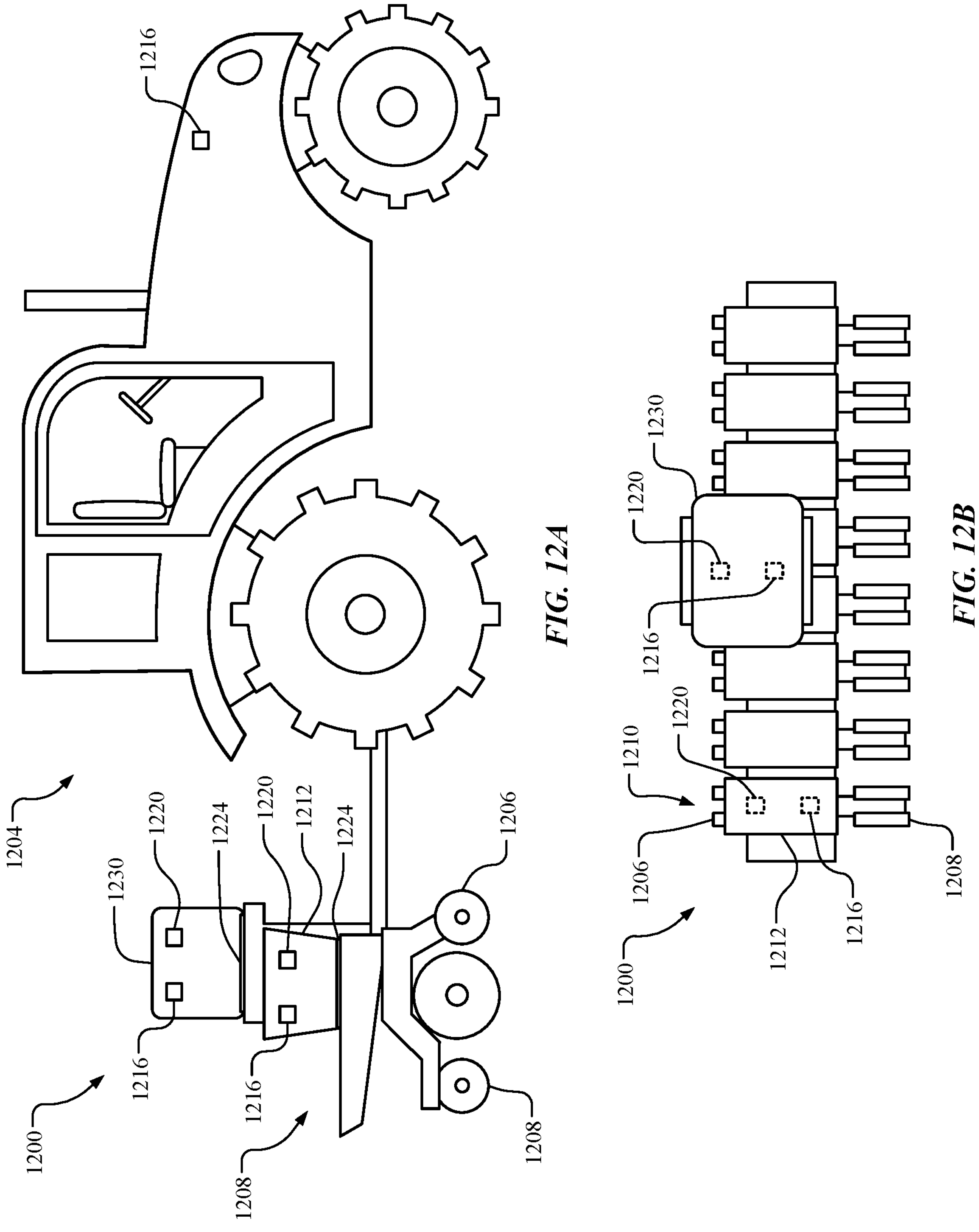
FIGS. 12A and 12B show an example planter according to the present disclosure.

FIGS. 12A and 12B show an example planter 1200. Although shown as a drawn or tow-behind planter (i.e., e.g., a planter attachment configured to be towed behind machinery such as a tractor 1204), the principles of the present disclosure may be implemented with mounted/integrated planters or other type of planters, broadcast spreaders, etc. The planter 1200 is configured to form rows in a planting medium (e.g. to split soil to form a trough using row splitter assemblies 1206), add seeds to the rows, and, in some examples, close the rows subsequent to adding the seeds (e.g., using closing wheel assemblies 1208).

In this example, the planter 1200 includes a plurality of row assemblies 1210. In some examples (as shown), each of the row assemblies 1210 includes a dedicated seed bin 1212. In other examples, one or more of the seed bins 1212 may be shared by one or more of the row assemblies 1210. The seed bins 1212 are configured to store seeds and distribute the seeds through planting mechanisms of the row assemblies 1210 for planting in the rows.

In some examples, the planter 1200 includes one or more indicia 1216 used to identify the planter 1200. In some examples, the planter 1200 includes a plurality of the indicia 1216 (e.g., one for each of the seed bins 1212). The respective indicia 1216 may be the same or different. The indicia 1216 may be unique to the planter 1200 such that the planter 1200 can be distinguished from other planters. In some examples, the tractor 1204 may include one of the indicia 1216 to uniquely identify the tractor 1204, associate the tractor 1204 with the planter 1200, etc. For example, the indicia 1216 may correspond to any of the examples described above in FIGS. 7A-7E.

Referring to the seed tender 1100 in FIGS. 11A and 11B, the camera system 1128 can read indicia (such as the indicia 1216) and provide, to the theft detection system 1120, information related to the indicia. Additionally, in some embodiments, the planter 1200 includes a communication module 1220 (a plurality of communication modules 1220 for respective seed bins 1212) used to receive and/or transmit short-range wireless communication. The theft detection system 1120, also having communication capabilities, can retrieve information from the communication module 1220, such as a weight value of seed in the seed bins 1212, individually and/or collectively (as determined by the planter 1200 prior to an onboarding event, using one or more sensing devices 1224, etc.), authentication information used to verify the planter 1200 (including an expected planter and/or tractor during a harvesting operation), a time stamp associated with initiation of onboarding event, and/or a time duration associated with the time taken for the onboarding event.

Referring again to FIG. 4, the trailer 400 can be used as an onboarding container for onboarding seed to the seed tender 1100. In an example planting operation, the trailer 400 can remain stationary until the seed tender 1100 (e.g., towed by a tractor, such as the tractor 1204) arrives alongside the trailer 400 and the seed can be transferred from the trailer 400 to the seed tender 1100. As described above, the trailer 400 includes the indicium 416 to identify the trailer 400. The camera system 1128 can read the indicium 416 and provide, to the theft detection system 1120, information related to the indicium. The theft detection system 1120, also having communication capabilities, can retrieve information from the communication module 418 of the trailer 400. The retrieved information may include, but is not limited to, a weight value of seed in the container 420 (e.g., a weight value prior to and/or subsequent to transfer of the seed to the trailer 400, transfer of the seed from the trailer 400 to the seed tender 1100, etc.), authentication information used to verify the trailer 400, a time stamp associated with offloading event, and/or a time duration associated with offloading event.

Although described above with respect to granular seed, the principles of the present disclosure may be implemented for application of granular fertilizer (e.g., using the planter 1200 or a broadcast spreader), liquid fertilizer, and/or other agrochemicals. For example, the planter 1200 may include one or more tanks 1230 configured to store and distribute liquids such as liquid fertilizer, herbicides, pesticides, etc. In some examples, the planter 1200 may be configured to apply granular and/or liquid fertilizer at a same time as planting seed. The tank 1230, like the seed bins 1210, may include one of the indicia 1216, the communication module 1220, and/or the sensing devices 1224. In this manner, information associated with storage and transfer of agrochemicals to and from the tank 1230 (e.g., from an agrochemical tender or other type of agrochemical storage or transportation mechanism to the tank 1230) can be tracked by the theft detection system 1120 as described above.

Although described with respect to the planter 1200, the principles of the present disclosure may be implemented with other types of agrochemical application machines, such as dedicated sprayer tow-behind attachments, machines with mounted or integrated sprayer mechanism, etc. In each of these examples, the agrochemical application machines may include one or more tanks configured to store and distribute agrochemicals. Any such tank may include one or more of the indicia 1216, the communication module 1220, the sensing device 1224, etc.

Referring again to FIG. 5, the theft detection system 1120 may be implemented in a same or similar manner as the theft detection system 510 and can be mounted on the seed tender 1100, the planter 1200, the tractor 1204, or any other machinery or equipment associated with planting or growing operations as described above. For example, the sensing device 512 may be configured to determine a weight value of seed in a seed bin of a seed tender or planter, of granular fertilizer in a fertilizer bin, of liquid agrochemicals in a tank of an agrochemical sprayer, etc. For illustration purposes only, operation of the theft detection system 510 with respect to the embodiments described above in FIGS. 11A, 11B, 12A, and 12B will be described in accordance with granular seed.

In this regard, the sensing device 512 can determine a weight value of the seed during transfer events (e.g., either onboarding or offboarding) and provide the weight value information to the controller 530. Accordingly, based on the determined weight value by the sensing device 512, the theft detection system 510 can determine the weight value of the seed to be provided from the trailer to the seed tender and/or from the seed tender to the planter. The satellite data communication module 536 can provide the weight value information of seed, as determined by the sensing device 512, to the tracking system. Additionally, the satellite data communication module 536 can also provide indicia information of associated machinery (e.g., trailer, seed tender, planter, tractor, etc.), as determined by the camera system 514 communicatively coupled to the controller 530.

The short-range data communication module 538 is configured to communicate with the various communication modules to communicate information including, but not limited to, information identifying indicia of the trailer, the seed tender, the planter, and/or the tractor, weight values of seed in respective storage volumes of the trailer, the seed tender, and the planter (e.g., respective seed bins) prior to and subsequent to each transfer event, time stamps associated with initiation of each of the transfer events, and/or time durations associated with each of the transfer events. Alternatively, or in combination, the short-range data communication module 538 can determine identifying information of the various equipment by communicating with mobile devices as described above. The information communicated between the theft detection system 510 and the various equipment may be encrypted to prevent person from gaining knowledge of the weight values of the seed as described herein.

The theft detection system 510 can use the received information to monitor and detect seed theft in a number of ways. For example, prior to a transfer event, the theft detection system 510 receives a weight value of seed, using the short-range data communication module 538, from a communication module of a trailer. Additionally, the theft detection system 510 receives a weight value, using the sensing device 512, onboarded onto the seed tender (or, in some examples, directly to seed bins of a planter). Processor 532 can execute instructions stored on the memory 534 to compare and determine the difference between the weight values. If the difference between the weight values is greater than a predetermined threshold, then the controller 530 may generate and transmit a notification, using the satellite data communication module 536, to a tracking system. For example, a notification may include an alarm or alert indicating an unexpected difference (i.e., exceeded predetermined threshold) in seed has been detected, which may correspond to seed theft. Accordingly, the notification may indicate that seed was stolen during the transfer event.

In another example, the theft detection system 510 receives a weight value of seed, using the sensing device 512, disposed in the seed tender. Subsequent to an offloading event, the theft detection system 510 can obtain a weight value of seed, using the short-range data communication module 538, from a communication module of a planter. The processor 532 can again execute instructions stored on the memory 534 to compare and determine the difference between the weight values, and if the difference between the weight values is greater than a predetermined threshold, then the controller 530 can generate and transmit a notification, using the satellite data communication module 536, to the tracking system, indicating that seed was stolen during the transfer event.

In still other examples, the theft detection system 510 uses the short-range data communication module 538 to receive respective weight values of seed planted by the planter and stored in the seed bins. For example, for a given planting operation, weight values of seed in the seed bins may have an expected rate of decrease. In other words, for a given planting operation for a specific type of seed being planted at a predetermined rate, an expected rate of decrease in the weight value of the seed in the seed bins may be calculated. Accordingly, the weight value of the seed in the seed bins decreasing at a rate greater than the expected rate may indicate that seed was stolen from the seed bins during the actual planting operation. The comparison between the sensed and expected rate of decrease in the weight value of the seed in the bins may be performed continuously, periodically, conditionally, etc.

In some examples, the theft detection system 510 uses the sensing device 512 to continually monitor a cumulative weight value of seed in a seed bin. As a result, the theft detection system 510 can determine in real-time a weight value of seed in the seed bin during onboarding and offloading events, which can be advantageously used in several ways. For example, during an offloading event, the theft detection system 510 can continually monitor a cumulative weight value of seed in a seed bin, and when the theft detection system 510 does not receive a planter or tractor identity from corresponding equipment onto which the seed is to be offloaded, the theft detection system 510 can transmit a notification to the tracking system. The notification may indicate the seed is being offloaded to an unauthorized trailer or other unauthorized container. Also, the theft detection system 510 can continually monitor a cumulative weight value of seed in a seed bin, and in the absence of any type of onboarding or offloading event, if the cumulative weight of seed in the seed bin decreases, then the theft detection system 510 can transmit a notification to the tracking system. The notification may indicate the seed is being taken from the seed cart without authorization.

In some examples, the theft detection system 510 uses the short-range data communication module 538 to receive an expected weight value of seed and then compares the expected weight value with an actual weight value determined by the sensing device 512. For example, prior to a transfer event, the theft detection system 510 can receive an expected weight value from a trailer, seed tender, etc. indicating a weight value of seed to be transferred to seed tender, planter, etc. Then, subsequent to the transfer event, the theft detection system 510 can determine the actual weight value of received seed. The theft detection system 510 can then compare the expected and actual weight values, and provide a notification to the tracking system when the difference between the expected and actual weight values is greater than a predetermined threshold.

As described, the theft detection system 510 can be used to determine potential seed theft events and generate notifications to the tracking system. However, in some embodiments, the theft detection system 510 is designed to track/record various weight values, track/record various trailer, seed tender, planter, and tractor identities, and transmit this information to the tracking system, thereby allowing the tracking system to determine seed theft events. In other words, the theft detection system 510 can be used without determining potential seed theft events and without generating notifications, and can simply provide information to the tracking system.

Further, although described below with respect to weight values, the tracked information may correspond to other indicators of amounts of granular or liquid material stored and transferred. For example, for liquid materials, associated tanks, containers, etc. may include on or more flow sensors configured to sense an amount of liquid stored and transferred between containers and other equipment. Similarly, granular flow sensors may be used to sense an amount of granular material (i.e., seed or granular fertilizer) transferred between containers and other equipment.

In some examples, systems and methods as described herein are further configured to use the tracked information (e.g., tracked weight values, liquid flow, and/or granular flow) to determine an amount of material actually distributed by the equipment. For example, for liquid material, liquid flow sensors implemented by a sprayer other equipment may track an amount of liquid sprayed or otherwise distributed (e.g., by gallon or other unit per acre, hectare, etc.). Similarly, for granular material, granular flow sensors (e.g., seed counters) implemented by a planter other equipment may track an amount of seed planted or otherwise distributed (e.g., by seed count, seeds per acre or hectare, etc.).

In still other examples, tracked weight values for liquid and/or granular material can be used to determine gallons sprayed, seeds planted, etc. For example, for a given material, systems and methods as described herein may be configured (e.g., using stored data) to correlate weights of specific materials to units, such as pounds or kilograms (or other weight measurement) to gallons of respective materials, number of seeds (for different types of seeds), and so on. Accordingly, by tracking weight values and correlating weight values to various types of materials, actual volumes/counts of the different materials can be determined using the weight values.

As one example, a 50-pound bag of wheat may include approximately 50,000 seeds (e.g., 10,000 seeds per pound). Accordingly, if weight values of seed transferred to a planter and distributed by the planter are tracked and the number of seeds per unit of weight is known, the overall amount of seed planted by the planter can be calculated. A volume of liquid material sprayed can be calculated in a similar manner. Accordingly, systems and methods of the present disclosure may be configured to calculate gallons of liquid material sprayed per acre or hectare, seeds per acre or hectare planted, etc.

Alternatively or in addition to the above-described tracking of seed, systems and methods according to the present disclosure may be configured to determine whether seed was planted in an intended/target location. For example, only determining whether a same amount of seed is transferred to and from a seed tender, planted by a planter, etc. does not identify whether the seed was planted in the target location. In other words, the amount of seed planted by the planter may be the same as the amount of seed transferred to and from the seed tender even when the seed was planted at a location other than the target location. Accordingly, the theft detection system 510 according to the present disclosure is further configured to determine whether a location of the planter, the seed tender, and/or other equipment during planting of the seed corresponds to a target location.

For example, information received by the theft detection system 510 from the trailer, seed tender, planter, tractor, etc. may include a current location of the equipment, such as a GPS location determined by a GPS device or module (e.g., one or more GPS devices integrated with or implemented within the theft detection system 1120, the communication modules 1220, etc.). The theft detection system 510 may further store (or otherwise obtain) location information identifying the target location for the seed. For example, the location information may be stored in the memory 534. The location information may be transmitted or input to the theft detection system 510 when the seed is transferred to the trailer, transferred from the trailer to the seed tender, transferred to the planter, etc. In some examples, the location information includes a range of locations and/or a boundary of one or more locations (e.g., geofence information) encompassing one or more target locations (e.g., target planting fields/locations). The location information may be encrypted as described above.

Accordingly, the theft detection system 510 is configured to determine whether a current location of the planter (which may be a location that seed is transferred to the planter, a location that the planter is planting the seed, etc.) corresponds to the target location and selectively generate and/or transmit a notification that seed was (or is currently being) planted in a location other than the target location. For example, the processor 532 can execute instructions stored on the memory 534 to compare the current location to the target location. If the current location does not match the target location (e.g., exactly, within a predetermined distance threshold, etc.) then the controller 530 may generate and transmit a notification, using the satellite data communication module 536, to a tracking system. For example, the controller 530 may determine whether the current location is within a geofenced region corresponding to the target location. For example, a notification may include an alarm or alert indicating that the seed is being transported and/or planted in a location other than the target location, which may correspond to seed theft. Accordingly, the notification may indicate that seed was stolen during a planting operation.

In some examples, the target location may include multiple types of valid/permitted locations for the planter, such as primary locations (e.g., different fields or planting locations) and secondary locations (e.g., a loading location that is not within the planting locations, routes between planting locations, etc.). Accordingly, the target location may include two or more contiguous or non-contiguous locations (e.g. contiguous or non-contiguous geofenced regions). Accordingly, the controller 530 may be configured to refrain from generating the notification based on a determination of whether the planter is outside of a targeted planting location but nonetheless in a location that is not indicative of theft. In these examples, the controller 530 may be configured to instead generate the notification if the planter is in a secondary location for a period greater than a predetermined threshold period. For example, a loading operation may be associated with a first threshold period (e.g., 10 minutes), while traveling a route between different planting locations may be associated with a second threshold period (e.g., a period determined by a calculated amount of time required for the planter to travel/be towed from a first planting location to a second planting location). Accordingly, in some examples, the controller 530 is configured to determine whether the planter is in a secondary location for longer than the predetermined threshold period and generate the notification in response to the determination.

In other examples, the controller 530 may be configured to selectively generate the notification in response to a determination of whether the planter is actually planting seed in a location that does not match the target location. For example, the theft detection system 510 may be further configured to receive (e.g., from the communication modules 1220) an indication of whether the planter is currently planting/dispensing seed. The indication may include an indication of whether the weight of the seed in the seed bins is decreasing, an indication of whether planting mechanisms of the planter are currently operating (e.g., such as signals from sensors indicating that power is being provided to the row assemblies 1210), etc. In these examples, the controller 530 is configured to determine whether the planter is in a location outside of the target location and performing a planting operation and generate the notification in response to the determination.

In these and other examples, the controller 530 may be configured to selectively disable planting in response to a determination that the planter is in a location outside of the target location and performing a planting operation. For example, the controller 530 may be configured to cause the theft detection system 510 to transmit a signal to the planter to disable one or more electrical or mechanical components of the planter (e.g., open or close one or more switches or valves associated with providing hydraulic, mechanical, or electric power to the planter, close valves, doors, etc. configured to allow seed to be distributed from the seed bins, etc.). In other examples, a default status of the planter may be disabled and the controller 530 is configured to cause the planter to transition from the disabled state to an enabled state (e.g., enable switches, valves, doors, etc. to be actuated) only in response to a determination that the planter is in the target location.

In still other examples, the controller 530 may be configured to selectively generate the notification in response to a determination that a current location of the planter was not received (e.g., within an expected period subsequent to transfer of seed to the planter, beginning of planting, etc.). In other words, if the controller 530 is unable to compare the current location of the planter to the target location due to a failure to receive the current location, the controller 530 may selectively generate the notification. For example, the current location may be prevented from being transmitted by the planter and/or received by the theft detection system 510 due to tampering or other interference, loss of signal, damage or other mechanical/electrical faults, etc. Although not all of the causes of failure to receive the current location correspond to theft, the controller 530 may nonetheless generate the notification in response to not receiving the current location within the expected period. In some examples, reception of the current location in a periodic manner (e.g., once per second, once per ten seconds, etc.) corresponds to a "heartbeat" function and the controller 530 is configured to generate the notification in response to termination of the heartbeat function.

In still other examples, the principles of the present disclosure may be implemented for tracking fuel extraction/transfer to/from agricultural machinery, fuel usage/consumption by the agricultural machinery, etc. For example, systems and methods according to the present disclosure may be configured to track weight or volume of fuel extracted from storage vessels, transferred to equipment, and/or used by the equipment. For example, the theft detection system 510 may be configured to determine which equipment used fuel, whether the equipment used the fuel in a target location, etc.

Figure 13:
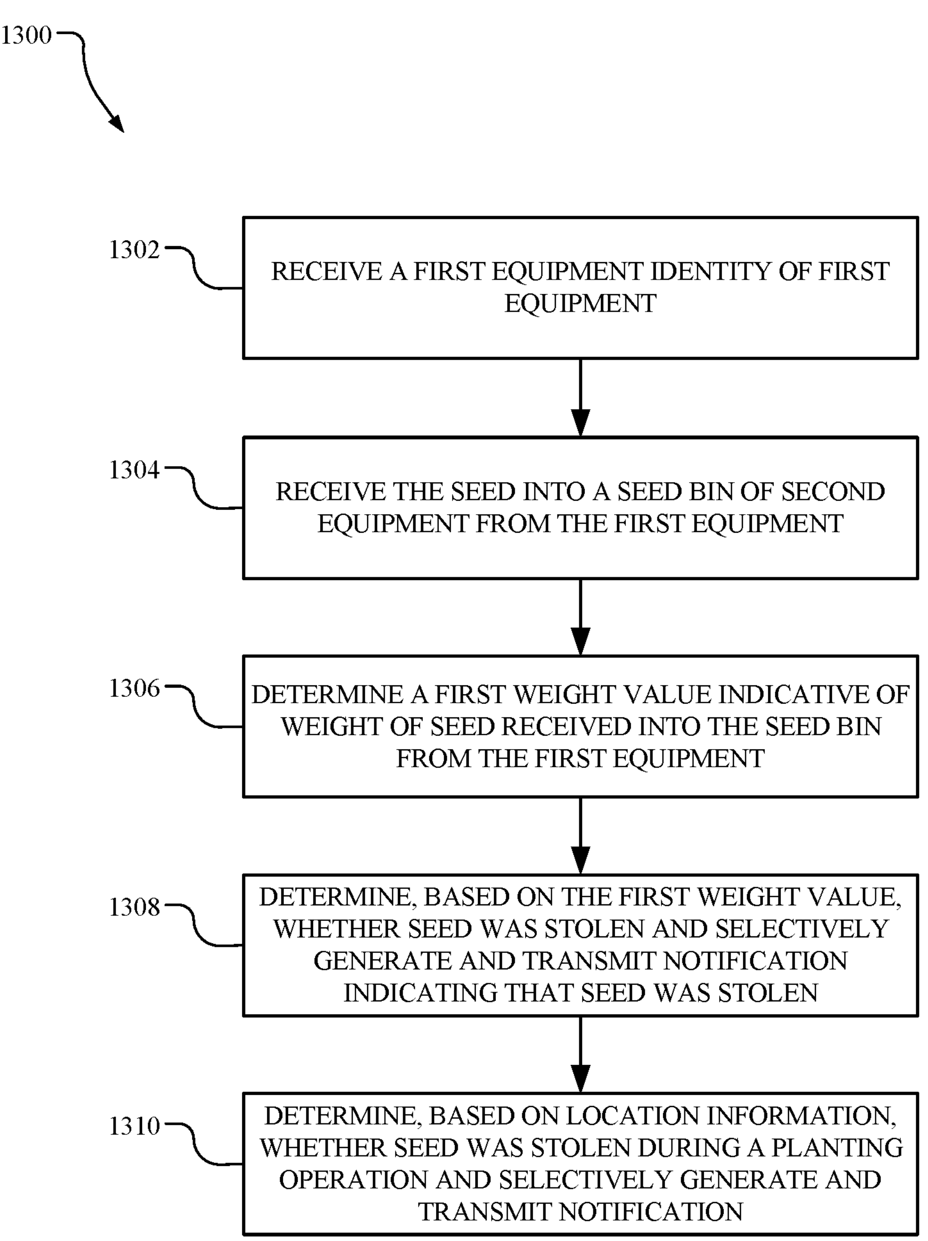
FIG. 13 shows an example method for tracking seed during a planting operation according to the present disclosure.

FIG. 13 shows an example method 1300 for tracking seed during a planting operation according to the principles of the present disclosure. Steps of the method 1300 can be performed by a theft detection system described herein. For example, one or more processors or processing devices, individually or collectively, are configured to execute instructions stored in memory to implement the method 1300, such as one or more processors of the systems descried herein. Although described with respect to tracking seed, the steps of the method 1300 may be implemented in a similar manner for tracking granular or liquid fertilizer, other agrochemicals, fuel, etc. as described above in more detail.

In step 1302, a first equipment identity of first equipment is received. In this example, the first equipment corresponds to equipment containing and/or transporting seed for transfer to second equipment. For example, the first equipment may correspond to a trailer, a seed tender, etc. Accordingly, the second equipment corresponds to equipment configured to receive the seed from the first equipment (e.g., a seed tender configured to receive seed from a trailer, a planter configured to receive seed from a seed tender and/or a trailer, etc.).

A theft detection system (e.g., disposed on the second equipment, third equipment, etc.) can receive the first equipment identity. In some embodiments, the theft detection system includes a short-range wireless communication module used to communicate and receive the first equipment identity from a communication module on the first equipment. In some embodiments, the theft detection system uses a camera system used to read indicia that identifies the first equipment. As non-limiting examples, the indicia may include a number visible on the first equipment, a bar code (one- or two-dimensional) disposed on the first equipment, and a word visible on the first equipment. Additionally, in some embodiments, the theft detection system can communicate with a mobile device of an operator of the first equipment to determine the first equipment.

In step 1304, the seed is received into a seed bin of the second equipment from the first equipment. In step 1306, a first weight value indicative of weight of seed received into the seed bin of the second equipment from the first equipment is determined. In order to determine the first weight value, the second equipment may include a sensing device communicatively coupled to the theft detection system, including a controller of the theft detection system. As non-limiting examples, the sensing device may include an image sensing device, a weight management system, or a flow rate sensor. Using the sensing device, the theft detection system can determine an amount of seed received from the first equipment.

In step 1308, the method 1300 (e.g., the theft detection system) determines, based on the first weight value, the first equipment identity, etc., whether seed was stolen and selectively generates and transmits a notification to a tracking system remotely located from the second equipment. For example, the theft detection system compares the first weight value to a second weight value associated with the first equipment identity. For example, the second weight value may correspond to an amount of seed stored/transported by the first equipment, and amount of seed expected to be delivered/transferred to the second equipment, etc. Accordingly, if the first weight value is less than the second weight value, the method 1300 may determine that seed was stolen.

In other examples, rather than determining whether the seed was stolen using the theft detection system, the theft detection system may instead transmit the first weight value and the first equipment identity to the tracking system. In these examples, the tracking system may determine whether the seed was stolen based on the first weight value, the first equipment identity, etc. as described above.

The tracking system may take the form of any number of remote systems, such as a remote server (including a cloud-based server), a database, a computing system, etc. as described above. In order to transmit the notification, the theft detection system may include a satellite data communication module that transmits via satellite data communication protocol. Additionally, in order to prevent persons from obtaining the first weight value, the first equipment identity, other data contained in the notification, etc., the theft detection system may include an encryption module that encrypts data related to the first weight value and the first equipment identity, thereby allowing the satellite data communication module to transmit data at least partially in an encrypted form.

In step 1310, the method 1300 (e.g., the theft detection system and/or the tracking system) determines, based on location information, whether seed was or is being stolen during a planting operation and selectively generates and transmits a notification accordingly. For example, the theft detection system is configured to determine a current location of the second equipment (e.g., a planter) planting seed, compare the current location to a target location, and determine whether the seed is being planted based on a comparison between the current location and the target location as described above.

Although described with respect to transfer of seed from first equipment to second equipment, the method 1300 may be implemented for transfer between three or more locations, such as from third equipment (e.g., a trailer) to the first equipment (e.g., a seed tender) and from the first equipment to the second equipment (e.g., a planter).

Figure 14A:
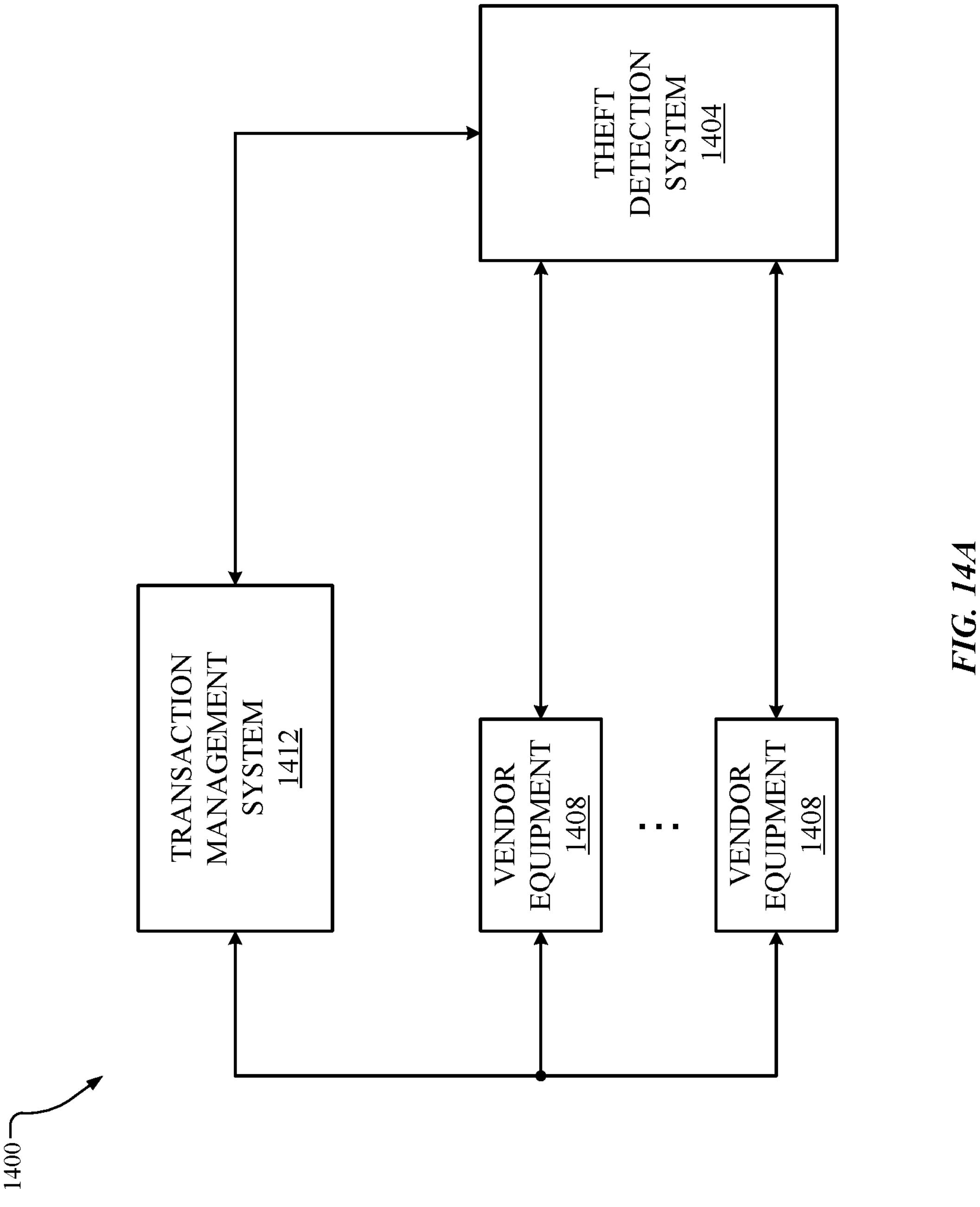
FIG. 14A shows an example material tracking system according to the present disclosure.

FIG. 14A shows an example material tracking system 1400 according to the principles of the present disclosure. The material tracking system 1400 may be implemented within any of the systems and/or equipment described above. Further, in some examples, various crop spraying and/or seed application/spreader operations may be performed by and/or under the control of an entity other than the owner/operator a target field, such as an employee operator, a third party vendor operator, etc. For example, agricultural material may be purchased, from a first entity, for application to a target field by the first entity or a second entity. In other words, a vendor of the agricultural material may be the same as or different from a vendor contracted to apply the agricultural material. The material tracking system 1400 of the present disclosure is configured to track agricultural material provided by and/or applied by one or more third parties to a target field as described below in more detail.

The material tracking system 1400 includes a theft detection system 1404 (e.g., corresponding to the theft detection system 510, 1120, etc. described above). Although referred to in the present embodiment as a theft detection system, the theft detection system 1404 may be further configured as a tracking system as described herein. Respective components of the theft detection system 1404 may be disposed, individually or collectively, on various agricultural equipment, including, but not limited to, vendor equipment 1408. For example, the vendor equipment 1408 may include material storage, material transportation, and/or material application/distribution equipment (e.g., sprayers, spreaders, etc.).

The material tracking system 1400 includes a transaction management system 1412 configured to communicate with the theft detection system 1404 and the vendor equipment 1408. The transaction management system 1412 is configured to monitor transactions for agricultural materials and generate, maintain, and update transaction records corresponding to the transactions. As used herein, "transactions" may refer to new or ongoing purchases or acquisitions of various agricultural materials, and may include, but are not limited to, storage, transfer, delivery, and application of the agricultural materials, including transfer between two or more entities or types of equipment. For example, a transaction may include loading or retrieval of agricultural material from a storage or transportation container operated by a first entity to first equipment operated by the first entity or a second entity, transfer of the agricultural material from the first equipment to second equipment operated by the first entity, the second entity, or a third entity, application of the agricultural material from the second equipment to a target field (e.g., a target field owned and/or maintained/farmed by the second entity, the third entity, or a fourth entity), etc. The transaction management system 1412, in conjunction with functions performed by the theft detection system 1404, is configured to update the transaction records based on various data obtained during transfer and application of the agricultural material as described below in more detail.

Although shown separate from the theft detection system 1404, all or portions of the transaction management system 1412 may be located within the theft detection system 1404. For example, one or more components of the theft detection system 1404 (e.g., the controller 530) may be configured to perform functions associated with the transaction management system 1412. In an example, one or more controllers, processors, etc., either located within a same computing system or different computing systems (e.g., a distributed computing system, one or more remote servers, a cloud computing system, etc.) may be configured to perform functions of one or both of the theft detection system 1404 and the transaction management system 1412. Further, although shown as a single theft detection system 1404, various components of the material tracking system 1400 may include components of the theft detection system 1404, respective theft detections systems, etc. For example, each vendor equipment 1408 may 1408 may include respective sensing devices 512, satellite data communication modules 536, short-range data communication modules 438, encryption modules 544, camera systems 514, etc.

Figure 14B:
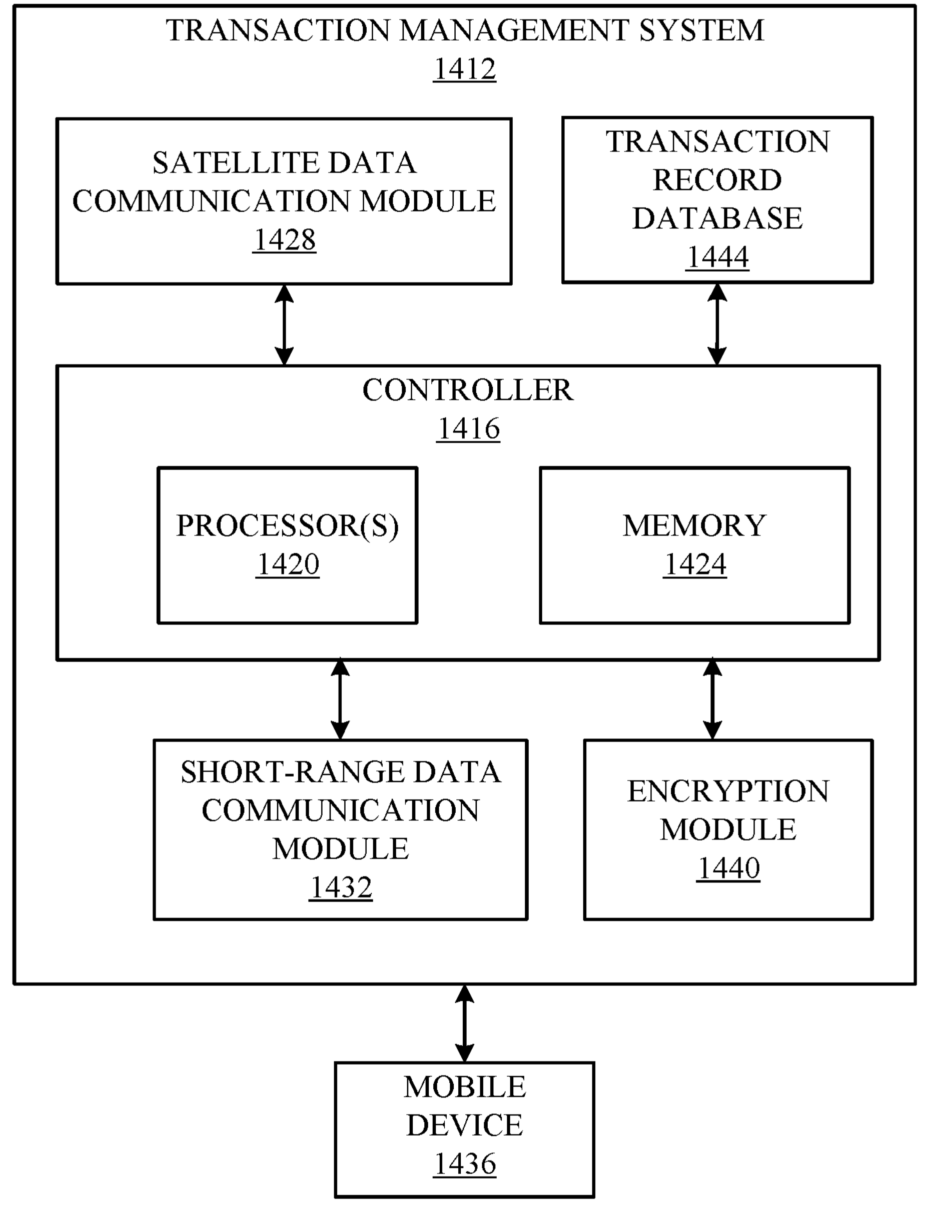
FIG. 14B shows a schematic diagram of an example transaction management system according to the present disclosure.

FIG. 14B shows a schematic diagram of an example transaction management system 1412. The transaction management system 1412 may include a controller 1416 used to receive communication from input devices and use the communication to output controls or commands to other devices. The controller 1416 may include a programmable logic controller or one or more microcontrollers, as non-limiting examples. The controller 1416 may include one or more processors 1420 and memory 1424. When the controller 1416 is implemented as a processor 1420 and memory 1424, the one or more processors 1420 are designed to execute instructions or algorithms stored on the memory 1424, which may include random access memory or read-only memory. While components of the transaction management system 1412 are shown within a same schematic representation of the transaction management system 1412, one or more of the components may be located at various locations remote from one another.

The transaction management system 1412 may further include a satellite data communication module 1428 operatively coupled to the controller 1416. The satellite data communication module 1428 may rely upon satellite data communication protocol, such as the Iridium Satellite Communications system, to transmit information. Response to the controller 1416, the satellite data communication module 1428 is configured to transmit information to and receive information from various devices (e.g., a server, including a cloud-based server, a database, a computing system, etc.). For example, the satellite data communication module 1428 is configured to facilitate communication between the transaction management system 1412 and other components of the material tracking system 1400, such as the theft detection system 1404, vendor equipment 1408, etc. In this manner, the satellite data communication module 1428 is configured to transmit and receive measurement information (e.g., weigh values, flow rate measurements, volume measurements, etc.) of agricultural material as determined by respective sensing devices (e.g., such as the sensing devices 512 described herein). Additionally, the satellite data communication module 1428 can also provide indicia information of machinery as determined by respective camera systems 514.

The transaction management system 1412 may further include a short-range data communication module 1432. The short-range data communication module 1432 is configured to communicate with communication modules of vendor equipment. As non-limiting examples, communication may include: transmitting and receiving of identifying indicia of vendor equipment; a weight value and/or other measurements of agricultural material in vendor equipment prior to an onboarding event, during transportation of the agricultural material, subsequent to an offboarding event, etc.; a time stamp associated with initiation of the onboarding or offboarding events; and/or a time duration associated with the onboarding or offboarding events.

Alternatively, or in combination, the short-range data communication module 1432 can determine identifying information of vendor equipment by communicating with mobile devices, including mobile wireless communication devices (e.g., smartphones) that also include short-range wireless communication modules operating over short-range communication protocols. For example, when an operator (e.g., driver) of the vendor equipment carries a mobile device 1436, the mobile device 1436 can store identification information that is unique to the vendor equipment. The transaction management system 1412 can use the short-range data communication module 1432 to communicate with the mobile device 1436 and receive the unique identification information.

In order to prevent persons (including vehicle operators of the vendor equipment, farmhand/laborers, and/or other nefarious actors) from gaining knowledge of the measurements of the agricultural material, the transaction management system 1412 may further include an encryption module 1440 operatively coupled to the controller 1416. Prior to the satellite data communication module 1428 transmitting information to other components of the material tracking system 1400, the encryption module 1440 can use an encryption algorithm (e.g., private key or public key encryption) to encrypt the information. In either encryption algorithm, the key is shared with the tracking system, and if desired, shared with only trusted personnel.

The transaction management system 1412 can use transmitted and received information to monitor and track the agricultural material (and detect theft of the agricultural material) as described below in more detail. For example, as described above with respect to FIG. 5 and elsewhere throughout the present disclosure, the transaction management system 1412 is configured to: receive measurement information and/or expected measurement information from respective communication modules of vendor equipment during all stages of storage; transfer and transportation, and application of the agricultural material; compare and determine differences between measurement information (e.g., differences between amounts of the agricultural material purchased, onboarded, offboarded, and applied); perform one or more actions based on differences between various measurements; etc.

In an example, the transaction management system 1412 generates and updates transaction records and maintains a transaction record database 1444. For example, the transaction management system 1412 generates a transaction record for a given transaction, stores the transaction record in the transaction record database, and updates the transaction record at various stages of storage, transfer, transportation, and application of an agricultural material for a planting or growing operation. Although shown within the transaction management system 1412, the transaction record database 1444 may be located external to the transaction management system 1412 such as in one or more remote computing devices (e.g., in one or more remote servers, a cloud computing system, etc.).

The transaction record may include information such as: a transaction identifier (e.g., a unique identifier corresponding to the transaction); an amount and type of the agricultural material associated with the transaction, origin and destination (e.g., a target field) information; respective identifiers of each vendor equipment expected to store, transfer, transport, and/or apply the agricultural material; locations of expected storage, transfer, transportation, application, etc. of the agricultural material; measurement information obtained for each stage of storage, transfer, transportation, and/or application of the agricultural material between the origin and destination; any differences between the measurement information obtained for respective stages, vendor equipment, etc.; and timestamps and/or other time information corresponding to each transfer of the agricultural information, application of the agricultural material, etc., and corresponding measurement information.

In this manner, the transaction record for a given transaction indicates (i) the amount of agricultural material of the transaction (i.e., an amount of the agricultural material purchased/requested and expected to be applied to the target field), (ii) whether the expected amount (e.g., measured in weight and/or volume) of the agricultural material was retrieved from the origin and transferred to and from each vendor equipment between the origin and the destination, and (iii) whether the expected amount of the agricultural material was applied to the target field.

Figure 15:
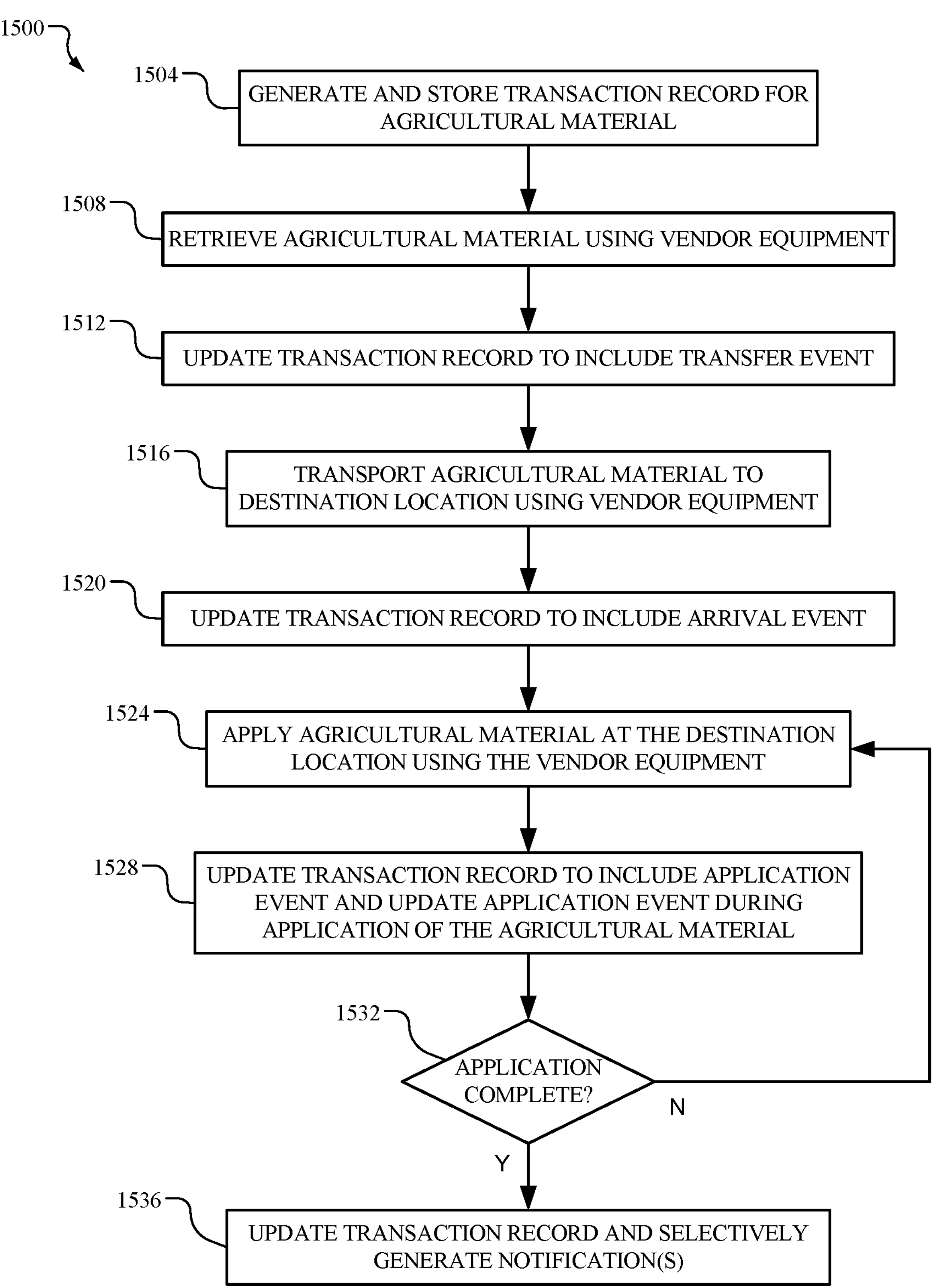
FIG. 15 shows an example method for tracking agricultural material during a planting or growing operation according to the present disclosure.

FIG. 15 shows an example method 1500 for tracking agricultural material during a planting or growing operation according to the principles of the present disclosure. Steps of the method 1500 can be performed by a material tracking system as described herein, such as the material tracking system 1400 and transaction management system described above in FIGS. 14A and 14B. For example, one or more processors or processing devices, individually or collectively, are configured to execute instructions stored in memory to implement the method 1500, such as one or more processors of the systems descried herein. While the method 1500 will described with respect to a spraying operation performed by vendor equipment such as a ground-based sprayer, the steps of the method 1500 may be implemented in a similar manner for tracking transfer, transportation, and application of granular seed, granular or liquid fertilizer, and/or other agrochemicals as described above in more detail. Further, while described with respect to tracking agricultural material retrieved, transported, and applied by singular vendor equipment (e.g., a transaction corresponding to retrieval of liquid material from a first location by a ground-based sprayer, transportation of the liquid material from the first location to a second location by the ground-based sprayer, and application of the liquid material to a target field associated with the second location by the ground-based sprayer), the method 1500 may be implemented in a similar manner for transactions using a plurality of vendor equipment between retrieval of the agricultural material at the first (e.g., origin) location and application of the agricultural material at the second (e.g., destination) location.

At 1504, the method 1500 (e.g., the transaction management system 1412) generates and stores a transaction record. For example, the transaction record is generated in response to completion of a purchase, order, request, etc. for agricultural material from a first entity (e.g., a vendor associated with the agricultural material) by a second entity (e.g., an operator or owner associated with a target field). In an example, the transaction record is generated in response to completion of a transaction executed using a computing device (e.g., a mobile device) of the second entity and/or the first entity.

In an example, the initial transaction record (e.g., as initially generated upon completion of the transaction) may include fields such as a unique identifier, an amount of the agricultural material to be delivered/applied to the target field, an origin location (e.g., location information, such as GPS coordinates corresponding to a storage location of the agricultural material, a location where vendor equipment is to retrieve the agricultural material, etc.), and a destination location (e.g., location information, such as GPS coordinates corresponding to a target field where the agricultural material will be applied):

Initial Transaction Record (Identifier)
Amount of Material for Transaction
  Origin Location (GPS Coordinates)
  Destination Location (GPS coordinates)

In an example, the GPS coordinates may include a range of locations and/or a boundary of one or more locations (e.g., geofence information) encompassing one or more target locations (e.g., target planting fields/locations). In other words, the destination location may not simply identify a single location and instead may identify a plurality of locations and/or boundaries of locations where the agricultural material can be applied.

In some examples, the agricultural material is retrieved by vendor equipment at 1508. In other examples, vendor equipment already containing the agricultural material is selected/identified by the first entity. The vendor equipment may be operated by the first entity or a different entity (e.g., a third entity not associated with or employed by the first entity or the second entity).

At 1512, the transaction record is updated (e.g., by the transaction management system 1412) to include a transfer event and/or to identify the vendor equipment containing the agricultural material:

Updated Transaction Record (Identifier)
  Amount of Material for Transaction
    Origin Location (GPS Coordinates)
    Destination Location (GPS coordinates)
  Transfer Event(s) (Vendor Equipment Identifier, Timestamp, Measurement information)

For example, in response to retrieval of the agricultural material by the vendor equipment (e.g., transfer of the agricultural material from a storage location or container at the origin location to the vendor equipment), the transaction record is updated to add a transfer event including a vendor equipment identifier, a timestamp or other time information indicating a time of the transfer event, and measurement information obtained prior to, during, and/or subsequent to completion of the transfer event. The measurement information may include, but is not limited to: a decrease in a weight value obtained from a sensing device associated with the storage location/container (e.g., measurement information indicating a reduction of an amount of the agricultural material stored in the storage location), volume and/or flow measurements obtained from one or more flow sensors associated with the storage location/container and the vendor equipment (e.g., a first flow sensor indicating an amount of the agricultural material flowing out of the storage location/container, a second flow sensor indicating an amount of the agricultural material flowing into the vendor equipment, etc.), and/or an increase in a weight value obtained from a sensing device associated with the vendor equipment (e.g., measurement information indicating an increase of an amount of the agricultural material contained in the vendor equipment subsequent to the transfer). In some examples, the transfer event may include captured images of indicia identifying the vendor equipment, indicating the amount of agricultural material contained in the vendor equipment, etc. as described above.

The transfer event may further identify any discrepancies or differences between any of the measurement information respectively obtained from different sensors, an expected amount of the agricultural material, etc. For example, the transfer event may include one or more flags or other identifiers in response to measurement information obtained from the storage location/container being different from measurement information obtained from the vendor equipment and/or in response to any of the measurement information being different from the amount of agricultural material ordered/requested in the transaction. The flags/identifiers may include the amount of any respective differences.

Alternatively, in examples where the vendor equipment already contains a sufficient amount of the agricultural material, the transfer event may simply include the vendor equipment identifier, a timestamp indicating a time that the vendor equipment was selected/identified (e.g., by the first entity, a computing device associated with the first entity, etc.), and measurement information and/or indicia indicating an amount of the agricultural material contained in the vendor equipment. In this example, the vendor equipment may be owned/operated by the first entity and may be located at the origin location or another location associated with the first entity. For example, the vendor equipment may be contained within a fleet of vendor equipment operated by the first entity. Accordingly, the fleet may include multiple vendor equipment at different locations, facilities, etc.

The updated transaction record may be provided to and/or stored in one or more locations in addition to the transaction record database 1444. For example, the updated transaction record may be transmitted to a mobile device or other computing device associated with the second entity. In an example, the updated transaction record is provided to the second entity each time the transaction record is updated.

At 1516, the vendor equipment transports the agricultural material to the destination location. The vendor equipment may travel directly from the origin location to the destination location, travel to one or more intermediate locations prior to traveling to the destination location, etc. For example, the vendor equipment may perform application of the agricultural material at the one or more intermediate locations prior to traveling to the destination location. Accordingly, the transaction record may be updated to indicate each instance that the vendor equipment applied the agricultural material prior to arriving at the destination location (e.g., with GPS coordinates of the one or more intermediate locations, an amount of the agricultural material applied at the one or more intermediate locations, etc.). For example, the vendor equipment (e.g., using respective portions of a theft detection system of the vendor equipment, such as a sensing device, communication module, etc.) transmits measurement and/or other information to the transaction management system 1412 each time an amount of the agricultural material contained in the vendor equipment changes.

At 1520, the transaction record is updated (e.g., by the transaction management system 1412) to include an arrival event upon arrival at the destination location:

Updated Transaction Record (Identifier)
- Amount of Material for Transaction
  - Origin Location (GPS Coordinates)
  - Destination Location (GPS coordinates)
- Transfer Event(s) (Vendor Equipment Identifier, Timestamp, Measurement Information)
  - Arrival Event (Vendor Equipment Identifier, Timestamp, Measurement Information)

For example, in response to a determination that the vendor equipment arrived at the destination location, the transaction record is updated to add an arrival event including the vendor equipment identifier, a timestamp or other time information indicating a time that the vendor equipment arrived at the destination location, and measurement information obtained upon arrival of the vendor equipment at the destination location.

At 1524, the vendor equipment begins to apply the agricultural material at the destination location. At 1528, the transaction record is updated to include an application event:

Updated Transaction Record (Identifier)
- Amount of Material for Transaction
  - Origin Location (GPS Coordinates)
  - Destination Location (GPS coordinates)
- Transfer Event(s) (Vendor Equipment Identifier, Timestamp, Measurement Information)
  - Arrival Event(s) (Vendor Equipment Identifier, Timestamp, Measurement Information)
- Application Event(s) (Vendor Equipment Identifier, Timestamp(s), Measurement information, GPS coordinates)

For example, in response to a determination that the vendor equipment has begun application of the agricultural material at the destination location, the transaction record is updated to add an application event including the vendor equipment identifier, timestamps or other time information indicating times that the vendor equipment began and stopped applying the agricultural material, and GPS coordinates obtained during application of the agricultural material.

For example, in a manner similar to previous embodiments described above, the transaction management system 1412 is configured to determine whether the agricultural material is applied in the destination or target location corresponding to the transaction record and the amount of the agricultural material that is applied in the destination location. For example, information received by the transaction management system 1412 from the vendor equipment may include a current location of the vendor equipment, such as a GPS location determined by a GPS device or module (e.g., one or more GPS devices integrated with or implemented within the vendor equipment.

Accordingly, the transaction management system 1412 is configured to determine whether a current location of the vendor equipment (which may be a location that the vendor equipment is applying the agricultural material) corresponds to the destination location and selectively generate and/or transmit a notification that the material was (or is currently being) applied in a location other than the destination location. If the current location of the vendor equipment does not match the destination location (e.g., exactly, within a predetermined distance threshold, etc.) then the transaction management system 1412 may transmit a notification to a computing device associated with the first and/or second entity. For example, the transaction management system 1412 may determine whether the current location is within a geofenced region corresponding to the destination location. For example, a notification may include an alarm or alert indicating that the agricultural material is being applied in a location other than the destination location, which may correspond to theft of the material. Accordingly, the notification may indicate that agricultural material was stolen or otherwise applied to a location other than the destination location.

The transaction record may be updated in real-time or near real-time during application of the agricultural material. In an example, the application event may include a running or dynamic total of an amount of the agricultural material applied while within a geofenced location corresponding to the destination location. For example, a sensing device associated with the vendor equipment obtains measurement information during application of the agricultural material and the measurement information is provided along with the location information to the transaction management system 1412. The measurement information and the location information each include timestamp or other time information.

Accordingly, the transaction management system 1412 is configured to calculate an amount of the agricultural material applied (e.g., based on a decrease in a weight value, a flow rate of the agricultural material, etc.) while the vendor equipment is within the geofenced region. In other words, the transaction record is updated to increase the dynamic total in an amount corresponding to the amount of the material applied while the vendor equipment is within the geofenced region. Conversely, the dynamic total is not increased in response to a determination that the agricultural material is not being applied by the vendor equipment and/or a determination that the agricultural material is being applied while the vendor equipment is in a location outside of the geofenced region.

In some examples, the transaction management system 1412 may be configured to determine whether the agricultural material being applied, while the vendor equipment is within the geofenced region, is actually being applied to the destination location (e.g., as opposed to being applied to another location adjacent to the destination location, being removed from the vendor equipment without being applied to the destination location, being applied at a rate less than an expected rate, etc.). In other words, weight values and flow rates indicating that the agricultural material is being applied by or otherwise removed from the vendor equipment may not necessarily indicate that all or any of the agricultural material is being applied to a target field of the destination location.

In one example, the transaction record may include an expected application rate for the destination location. The expected application rate may include an expected flow rate, weight reduction rate, etc. The expected application rate may correspond to an expected application rate per unit of distance traveled (e.g., 10 feet, 100 feet, etc.) by the vendor equipment within the geofenced region, per time segment, etc. In other words, since the location of the vendor equipment is monitored by the transaction management system 1412, an amount of the material applied by (or otherwise removed from) the vendor equipment can be calculated per unit of distance traveled by the vendor equipment. In this manner, the transaction management system 1412 may be further configured to determine whether the amount of the agricultural material applied by the vendor equipment while within or near the geofenced region exceeds (or is less than) the expected application rate.

For example, a determination that the application rate of the agricultural material applied exceeds the expected application rate may indicate that the agricultural material is being removed from the vendor equipment by other means (e.g., transferred to different equipment rather than being applied to the destination location). Conversely, a determination that the application rate of the agricultural material is less than the expected application rate may indicate that an insufficient amount of the agricultural material is being applied to the destination location.

In some examples, the transaction management system 1412 may receive measurement information including both weight values and flow rates and determine whether there are inconsistencies between the weight values and the flow rates. For example, if the weight values indicate that a decrease in the amount of agricultural material contained in the vendor equipment is greater than the amount of agricultural material applied (e.g., through a sprayer) as indicated by the flow rates, the transaction management system 1412 may determine that some of the agricultural material is being removed from the vendor equipment without being applied to the target field.

At 1532, the method 1500 (e.g., the transaction management system 1412) determines whether the application of the agricultural material is complete. For example, the transaction management system 1412 is configured to, based on the location and measurement information received from the vendor equipment, determine whether the vendor equipment has completed application of the agricultural material (e.g., in response to application of the agricultural material stopping for a predetermined time threshold, in response to the vendor equipment being a predetermined distance from the destination location, etc.). In some examples, the vendor equipment transmits a notification to the transaction management system 1412 indicating that application of the agricultural material is complete (e.g., in response to input received from an operator of the vendor equipment). If complete, the method 1500 continues to 1536. If false, the method 1500 continues to 1524 to continue to apply the agricultural material and update the transaction record accordingly.

At 1536, the transaction record is updated to include application completion information:

Updated Transaction Record (Identifier)
- Amount of Material for Transaction
  - Origin Location (GPS Coordinates)
  - Destination Location (GPS coordinates)
- Transfer Event(s) (Vendor Equipment Identifier, Timestamp, Measurement Information)
  - Arrival Event(s) (Vendor Equipment Identifier, Timestamp, Measurement Information)
- Application Event(s) (Vendor Equipment Identifier, Timestamp(s), Measurement information, GPS coordinates)
  - Application Completion Information (Amount of Material Applied at Destination Location, Application Rate(s), Difference Between Amount of Material Applied and Expected Amount of Material, Differences Between Actual Application Rate (s) and Expected Application Rate)

For example, the application completion information may include, but is not limited to, the amount of material applied at the destination location (e.g., a final running or dynamic total of the amount of material applied, based on the measurement information obtained from the vendor equipment, while the vendor equipment was within the geofenced region), one or more application rates (e.g., a plurality of rates as calculated for respective units of distance traveled by the vendor equipment, time segments, etc.), a difference between the amount of the material applied and the expected amount of material indicated in the transaction record, and differences between respective applications rates and the expected application rate.

The transaction management system 1412 may transmit the updated transaction record to the computing device associated with the second entity and/or transmit a notification to a computing device associated with the first and/or second entity. For example, the notification may include an alarm or alert indicating that a difference between the amount of material applied and the expected amount of material is greater than a threshold, that a difference between one or more of the application rates and the expected application rate is greater than a threshold, etc. In this manner, the transaction management system 1412 is configured to determine whether the expected amount of agricultural material requested from the first entity by the second entity is actually applied to the destination location.

Figures 16A, 16B:
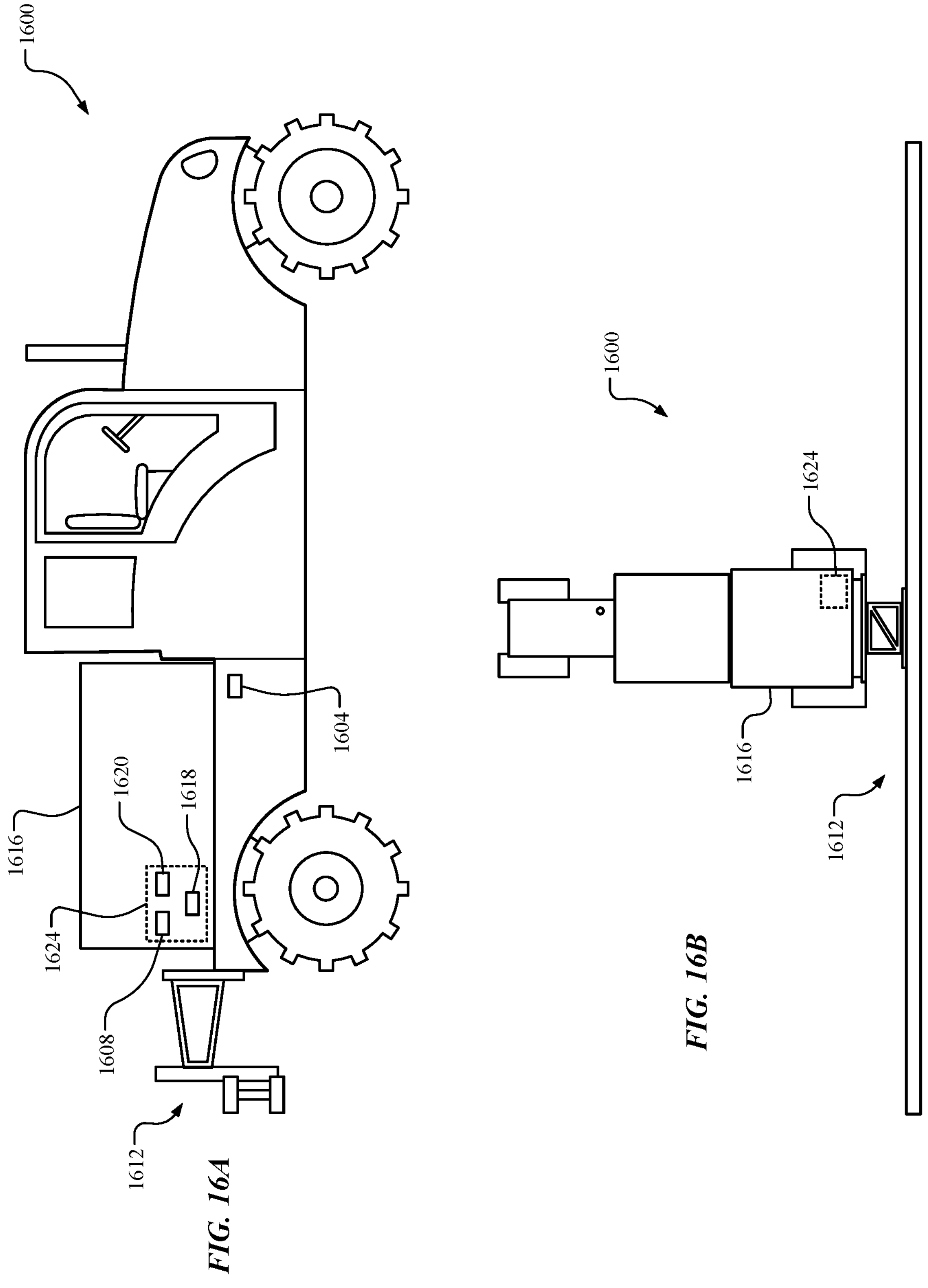
FIGS. 16A and 16B show an example ground-based sprayer according to the present disclosure.

FIGS. 16A and 16B respectively illustrate an example ground-based, self-propelled sprayer 1600 configured to operate in accordance with the material tracking system 1400 of the present disclosure. For example, the sprayer 1600 is an example of the vendor equipment 1408 of FIG. 14A. The sprayer 1600 is provided as only one example of the vendor equipment 1408, which may be include other types of sprayers and agricultural equipment.

Similar to other equipment described above, the sprayer 1600 may include one or more indicia 1604 used to identify the sprayer 1600. The indicia 1604 may be unique to the sprayer 1600 such that the sprayer 1600 can be distinguished from other vendor equipment. For example, the indicia 1604 may correspond to any of the examples described above in FIGS. 7A-7E. The indicia 1604 may be read by a camera system 1128 as described above.

The sprayer 1600 includes one or more sensing devices 1608 configured to measure an amount of agricultural material contained within one or more tanks 1612 (e.g., a tank or container configured to hold liquid material) of the sprayer 1600, added to the tank 1612, applied or distributed from the tank 1612 by the sprayer 1600 (e.g., via a boom sprayer assembly 1616 of the sprayer 1600), etc. For example, the sensing device 1608 may correspond to a weight sensor, a flow sensor, etc.

The sprayer 1600 may include a GPS module 1618 or other navigation module configured to determine a location of the sprayer 1600. The GPS module 1618 may be configured to generate location information (e.g., continuously, periodically, etc.) indicative of the current location of the sprayer 1600 as described above.

In an example, the sprayer 1600 includes a communication module 1620, which may include a short-range data communication module and/or a satellite or other long range data communication module. The communication module 1620 is configured to transmit the measurement information and the location information from the sprayer 1600, as obtained by the sensing device 1608 and the GPS module 1618, respectively, to the transaction management system 1412 as described above. In some examples, instead of and/or in addition to the communication module 1620, the sensing device 1608 or another device may include memory configured to store the measurement information and the location information, which can be retrieved from the sensing device 1608 via a communication port.

In some examples, the sprayer 1600 includes a material tracking device 1624 comprising the sensing device 1608, the GPS module 1618, the communication module 1620, and/or other components of any of the systems (e.g., the theft detection system 510) described herein. For example, the material tracking device 1624 may correspond to an integrated device including the sensing device 1608 configured to obtain the measurement information about the agricultural material, the GPS module 1618 configured to obtain the location information, and the communication module 1620 configured to communicate the measurement information and the location information to the transaction management system 1412 (and/or memory configured to store the measurement information and the location information for subsequent retrieval). For example, the sensing device 1608, the GPS module 1618, and the communication module 1620 may be enclosed within a same housing of an electronic device or module. In other examples, one or more of the sensing device 1608, the GPS module 1618, and the communication module 1620 may be located external to the material tracking device 1624. For example, the material tracking device 1624 may correspond to a controller, processor, memory, etc. configured to receive measurement signals from an external sensing device, location information from an external GPS module, etc.

In this manner, the sensing device 1608, the GPS module 1618, the communication module 1620, and/or the material tracking device 1624 can be installed on or within vendor equipment such as the sprayer 1600 to monitor retrieval, transfer, transportation, and application of agricultural material in accordance with the principles of the present disclosure described herein.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for tracking agricultural material to be transferred from a first entity to a second entity, the method comprising:

generating, at a transaction management system, a transaction record indicating a destination location for the agricultural material and a first amount of the agricultural material to be applied at the destination location;

receiving, at the transaction management system, (i) measurement information indicating a second amount of the agricultural material applied by vendor equipment at the destination location and (ii) location information indicating locations of the vendor equipment while applying the second amount of the agricultural material;

updating, at the transaction management system, the transaction record based on the received measurement information and location information; and at least one of transmitting, by the transaction management system using a satellite data communication protocol, the transaction record to the second entity, and determining, by the transaction management system, whether any of the agricultural material was not applied at the destination location based on a comparison between the first amount and the second amount and transmitting a notification based on the determination.

2. The method of claim 1, wherein the vendor equipment is operated by the first entity.

3. The method of claim 1, wherein the vendor equipment is operated by a third entity.

4. The method of claim 1, wherein:

the measurement information includes weight values indicating a decrease in weight of agricultural material contained within the vendor equipment; and the determining includes calculating the second amount based on the weight values.

5. The method of claim 1, wherein:

the measurement information includes flow rates indicating a volume of agricultural material applied by the vendor equipment; and the determining includes calculating the second amount based on the flow rates.

6. The method of claim 5, wherein the calculating the second amount based on the flow rates includes comparing the flow rates to an expected flow rate.

7. The method of claim 1, wherein updating the transaction record based on the received measurement information and the location information include updating a running total amount of the agricultural material applied to the destination location based on a determination of whether the vendor equipment is within a geofenced region corresponding to the destination location while applying the second amount of the agricultural material.

8. The method of claim 1, wherein the transaction record further includes at least one transfer event indicating a transfer of the first amount of the agricultural material to the vendor equipment.

9. The method of claim 1, wherein the vendor equipment is a ground-based sprayer and the agricultural material is liquid fertilizer, liquid pesticide, or liquid herbicide.

10. The method of claim 1, wherein the vendor equipment is a seed planter and the agricultural material is granular seed.

11. A material tracking system configured to track agricultural material to be transferred from a first entity to a second entity, the material tracking system comprising:

a transaction management system configured to generate a transaction record indicating a destination location for the agricultural material and a first amount of the agricultural material to be applied at the destination location;

receive (i) measurement information indicating a second amount of the agricultural material applied by vendor equipment at the destination location and (ii) location information indicating locations of the vendor equipment while applying the second amount of the agricultural material;

update the transaction record based on the received measurement information and location information; and at least one of transmit, using a satellite data communication protocol, the transaction record to the second entity, and determine whether any of the agricultural material was not applied at the destination location based on a comparison between the first amount and the second amount and transmitting a notification based on the determination.

12. The material tracking system of claim 11, wherein:

the measurement information includes weight values indicating a decrease in weight of agricultural material contained within the vendor equipment; and the determining includes calculating the second amount based on the weight values.

13. The material tracking system of claim 11, wherein:

the measurement information includes flow rates indicating a volume of agricultural material applied by the vendor equipment; and the determining includes calculating the second amount based on the flow rates.

14. The material tracking system of claim 13, wherein the calculating the second amount based on the flow rates includes comparing the flow rates to an expected flow rate.

15. The material tracking system of claim 11, wherein updating the transaction record based on the received measurement information and the location information include updating a running total amount of the agricultural material applied to the destination location based on a determination of whether the vendor equipment is within a geofenced region corresponding to the destination location while applying the second amount of the agricultural material.

16. The material tracking system of claim 11, wherein the transaction record further includes at least one transfer event indicating a transfer of the first amount of the agricultural material to the vendor equipment.

17. A transaction management system configured to track agricultural material to be transferred from a first entity to a second entity, the transaction management system comprising:

a controller configured to generate, based on a transaction for a first amount of agricultural material, a transaction record indicating a destination location for the first amount of the agricultural material;

at least one of (i) identify vendor equipment containing at least the first amount of the agricultural material and (ii) update the transaction record to include a transfer event indicating a transfer of at least the first amount of the agricultural material to the vendor equipment;

receive, from the vendor equipment, (i) measurement information indicating a second amount of the agricultural material applied by vendor equipment at the destination location and (ii) location information indicating locations that the vendor equipment is applying the second amount of the agricultural material;

update the transaction record based on the received measurement information and location information; and at least one of (i) transmit the transaction record to the second entity, and (ii) determine whether any of the agricultural material was not applied at the destination location based on a comparison between the first amount and the second amount and transmitting a notification to the second entity based on the determination.

18. The transaction management system of claim 17, wherein:

the measurement information includes weight values indicating a decrease in weight of agricultural material contained within the vendor equipment; and the determining includes calculating the second amount based on the weight values.

19. The transaction management system of claim 17, wherein:

the measurement information includes flow rates indicating a volume of agricultural material applied by the vendor equipment; and the determining includes calculating the second amount based on the flow rates.

20. The transaction management system of claim 17, wherein updating the transaction record based on the received measurement information and the location information include updating a running total amount of the agricultural material applied to the destination location based on a determination of whether the vendor equipment is within a geofenced region corresponding to the destination location while applying the second amount of the agricultural material.

* * * * *